United States Patent
Wiegmann et al.

(10) Patent No.: US 10,866,082 B2
(45) Date of Patent: Dec. 15, 2020

(54) METHOD FOR ADJUSTING OF A MEASURING DEVICE BY AN ADJUSTMENT BODY, ADJUSTMENT BODY AND METHOD FOR ADJUSTING AN ADJUSTMENT BODY

(71) Applicant: Carl Mahr Holding GmbH, Goettingen (DE)

(72) Inventors: Axel Wiegmann, Eisenberg (DE); Markus Lotz, Apolda (DE)

(73) Assignee: Carl Mahr Holding GmbH, Goettingen (DE)

( * ) Notice: Subject to any disclaimer, the term of this patent is extended or adjusted under 35 U.S.C. 154(b) by 0 days.

(21) Appl. No.: 16/410,589

(22) Filed: May 13, 2019

(65) Prior Publication Data

US 2019/0346250 A1    Nov. 14, 2019

(30) Foreign Application Priority Data

May 14, 2018  (DE) .................. 10 2018 111 466

(51) Int. Cl.
*G01B 9/02* (2006.01)
*G01B 11/255* (2006.01)

(52) U.S. Cl.
CPC ..... *G01B 9/02063* (2013.01); *G01B 9/02038* (2013.01); *G01B 11/255* (2013.01)

(58) Field of Classification Search
CPC ............ G01B 9/02063; G01B 9/02038; G01B 9/02057; G01B 9/02072; G01B 2290/15;
(Continued)

(56) References Cited

U.S. PATENT DOCUMENTS 6,801,323 B2   10/2004  Evans
6,894,788 B2    5/2005  Deck
(Continued)

FOREIGN PATENT DOCUMENTS

EP        0561178 A2    9/1993

OTHER PUBLICATIONS

German Office Action dated Jan. 23, 2019, in corresponding German Patent Application No. 10 2018 111 466.4, with machine English translation (14 pages).
Tony L. Schmitz et al. Improving Optical Bench Radius Measurements using Stage Error Motion Data. Applied Optics, Dec. 20, 2008, vol. 47, No. 36, pp. 6692-6700, USA. (9 pages).
(Continued)

*Primary Examiner* — Tarifur R Chowdhury
*Assistant Examiner* — Jonathon Cook
(74) *Attorney, Agent, or Firm* — Fitch, Even, Tabin & Flannery LLP

(57) ABSTRACT

A method for adjusting a measuring device having an interferometer unit with an optical axis, an optical distance measuring device with a measuring axis and a support slide that is moveable along a slide axis. The measuring axis is first aligned parallel to the slide axis. An adjustment body with a first spherical reflection and/or diffraction surface and a retro reflector at the back side is arranged at the support slide. It is brought into a first confocal position, in which a first center point of the first spherical reflection/diffraction surface coincides with the focus of the spherical wavefront that is emitted from the interferometer unit. The retro reflector defines a vertex that is located close to the first center point, such that the measuring axis of the distance measuring device extends close to the focus of the emitted spherical wavefront. In doing so, Abbe-faults can be reduced or eliminated.

20 Claims, 9 Drawing Sheets

(58) Field of Classification Search
CPC ............ G01B 11/255; G01M 11/0242; G01M 11/025; G01M 11/0271
See application file for complete search history.

(56) References Cited

U.S. PATENT DOCUMENTS

| | | | |
|---|---|---|---|
| 7,545,511 B1* | 6/2009 | Gutin | ................ G01M 11/0271 356/512 |
| 8,947,678 B2 | 2/2015 | Bridges | |
| 9,857,169 B1 | 1/2018 | North Morris et al. | |
| 2003/0025915 A1* | 2/2003 | Freimann | ................ G01J 9/02 356/512 |
| 2003/0223081 A1 | 12/2003 | Freimann | |

OTHER PUBLICATIONS

Lars A. Selberg. Radius Measurement by Interferometry. Optical Engineering (OE), Sep. 1992, vol. 31, No. 9, pp. 1961-1966, USA. (6 pages).

Tony L. Schmitz et al. Displacement Uncertainty in Interferometric Radius Measurements. CIRP Annals—Manufacturing Technology, 2002, vol. 51, No. 1, pp. 451-454, USA. (4 pages).

U. Griesmann et al. Measuring Form and Radius of Spheres with Interferometry. CIRP Annals—Manufacturing Technology, 2004, vol. 43, No. 1, pp. 451-454, USA. (4 pages).

Miao Erlong et al. Realization of Sub-Micron Radius of Curvature Measurement in Vertical Interferometer Workstation. Proceedings of SPIE, 2014, vol. 9282, pp. 92820M-1-92820M-7, USA. (7 pages).

* cited by examiner

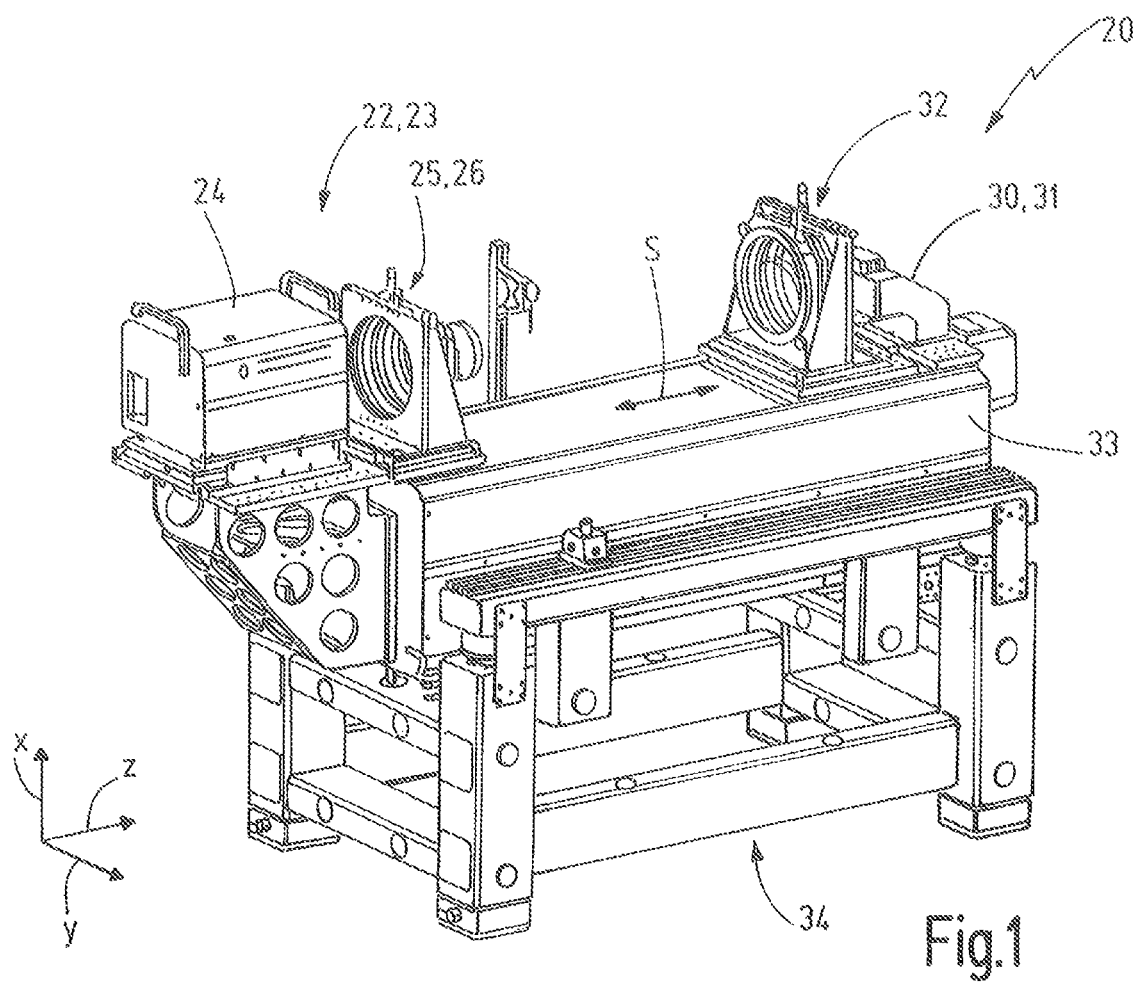
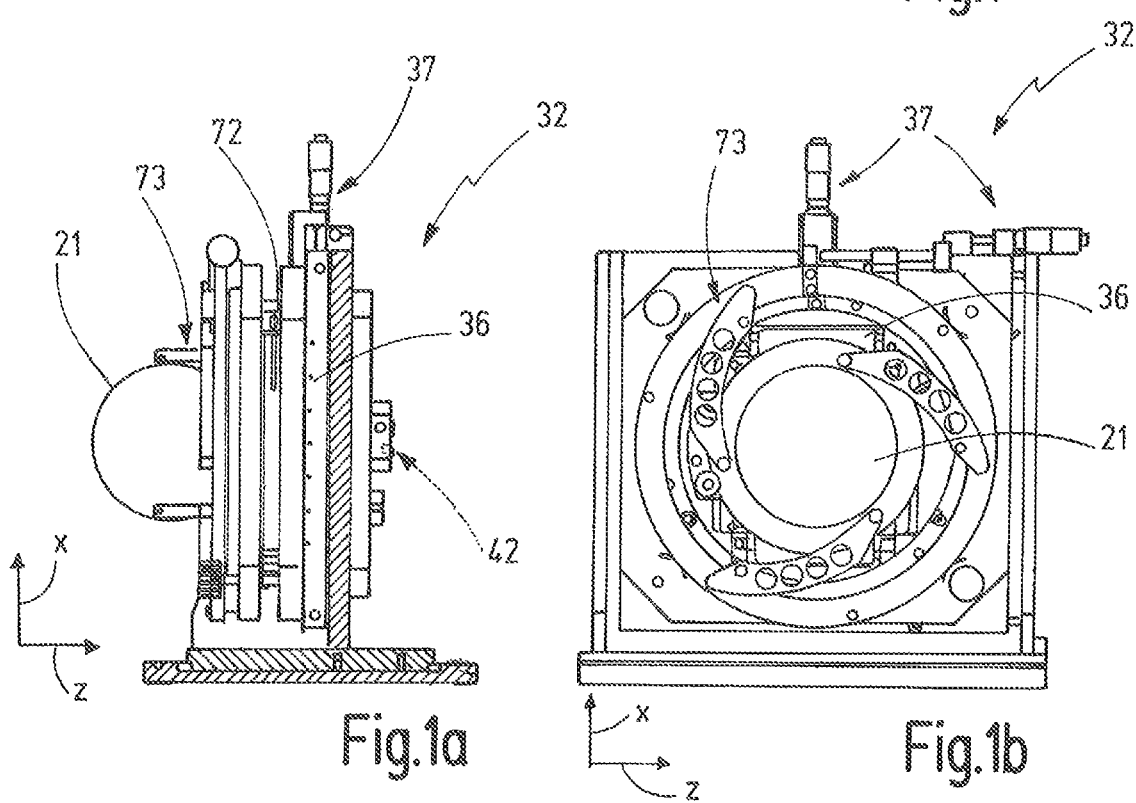
Fig.1
Fig.1a
Fig.1b

METHOD FOR ADJUSTING OF A MEASURING DEVICE BY AN ADJUSTMENT BODY, ADJUSTMENT BODY AND METHOD FOR ADJUSTING AN ADJUSTMENT BODY

RELATED APPLICATION(S)

This application claims the benefit of German Patent Application No. 10 2018 111 466.4, filed May 14, 2018, the contents of which is incorporated herein by reference as if fully rewritten herein.

TECHNICAL FIELD

The invention refers to a method for adjusting a measuring device comprising an interferometer unit, an optical distance- or displacement measuring device as well as a support slide that is moveable along a slide axis. The measuring device is particularly configured to measure a radius on a spherical workpiece, e.g. on lenses. The invention also refers to an adjustment body useable for the adjustment of the measuring device as well as a method for adjusting a multi-part adjustment body comprising a spherical artefact and a retro reflector.

BACKGROUND

For radii measurement of a spherical workpiece, a workpiece is regularly brought into two characteristic positions. In the one characteristic position a spherical wavefront emitted from the interferometer unit impinges on the surface of the workpiece at a focal point of the wavefront. This position is called "Cat's Eye Position". In the other characteristic position (confocal position) a propagation direction of the spherical wavefront is parallel to the respective surface normal of the workpiece to be measured at each impingement location, such that the focus of the spherical wavefront is located in the center point of the spherical surface of the workpiece. In fact, it is possible that the spherical wavefront does not reach its focus, because it impinges on the spherical surface before—thus the focus can also be called virtual focus or target focus in the confocal position. The distance between these two characteristic positions corresponds to the radius of the spherical surface of the workpiece.

In such methods and measuring devices avoiding or reducing of measuring faults is difficult, if the measuring axis of the distance measuring device that determines the difference between the two characteristic positions is not exactly aligned relative to the optical axis of the interferometer unit or the center point of the spherical surface of the workpiece. Thus, Abbe-faults can be created during the measurement.

EP 05 61 178 A2 describes in general a method and a device for the interferometric determination of a radius of a spherical workpiece.

In the literature influences onto the measuring accuracy of such methods are described, e.g. L. A. Selberg, "Radius Measurement by Interferometry", Optical Engineering, 31(9), pages 1961-1966, 1992. Under ideal conditions a repeatability of 20 nm can be achieved (U. Griesmann et al., "Measuring Form and Radius of Spheres with Interferometry", CIRP Annals—Manufacturing Technology, 53(1), pages 451-454, 2004). The repeatability is, however, not the main influence factor on the measuring uncertainty of the devices available on the market that have measuring uncertainties in the one digit micrometer range.

If an offset (Abbe-offset) between the measuring axis and the moving axis exists, an Abbe-fault can be created due to tilting. In order to be able to minimize an Abbe-fault, the Abbe-offset has to be reduced.

For reducing temperature influences, measuring devices are used in which the distance between the interferometer unit and the workpiece is measured by three separate distance measuring devices. To be able to minimize an Abbe-fault while doing so, the three distance measuring devices must span an equilateral triangle and the focus of the interferometer unit must be located in the center of gravity of the equilateral triangle. Such a device is elaborate and difficult to adjust (Erlong Miao et al., "Realization of submicron radius of curvature measurement in vertical interferometer workstation", Proc. SPIE 9282, 7$^{th}$ International Symposium on Advanced Optical Manufacturing and Testing Technologies: Optical Test and Measurement Technology and Equipment, 9282OM (Sep. 18, 2014), doi:10.1117/12.2070796).

Other methods and measuring devices have the goal to minimize or eliminate adjustment inaccuracies created by an Abbe-fault by a correction calculation (Schmitz et al. "Improving optical bench measurements using stage error motion data", Applied Optics, Vol. 47, No. 36, pages 6692-6700, Dec. 20, 2008).

It is adverse with correction calculations that the cause of the fault, e.g. a tilting angle, an axis offset (Abbe-offset), etc. must be known very precisely in order to be able to execute a correction calculation. Therefore, in some measuring devices instead of a distance measuring device, three separate distance measuring devices or a single distance measuring device and an additional angle sensor are used for determination of a tilting or inclination angle. In such measuring devices it is also possible to eliminate or minimize the Abbe-fault by eliminating of tiling angles and axis offsets by controllable actuators. However, heat is created by such actuators, wherein temperature fluctuations have a far adverse influence on the achievable measurement accuracy compared with Abbe-faults.

US 2003/0223081 A1 describes a method for calibrating a radius test bench for measuring of spherical workpieces. For calibration an adjustment body in form of a diffractive element is used that comprises a plurality of coaxial arranged rings that are arranged such that they can reflect a spherical wavefront in itself. In order to be able to calibrate the radius test bench with such an adjustment body, precise knowledge of the radii is required that is defined by the diffractive element. The adjustment is achieved with this method only for very specific relative positions between the workpiece to be measured and the interferometer unit and must be completely executed again, if the object lens of the interferometer unit is exchanged.

U.S. Pat. Nos. 8,947,678 B2 and 9,857,169 B2 describe additional methods in order to minimize measuring faults, wherein elaborate devices are used respectively.

Alternative methods and devices use short coherent light (U.S. Pat. No. 6,801,323 B2) or laser light with a variable wavelength (U.S. Pat. No. 6,894,788 B2) instead of the mechanical movement of the workpiece.

Starting from the prior art it can be considered as an object of the present invention to create a method for adjustment of a measuring device by using an adjustment body that allows a quick and simple minimization or elimination of an Abbe-fault and can be used independent from the radii of the spherical workpieces. Particularly in doing so, a method shall be used in which the actual dimensions of an adjustment body do not have to be known or do not have to be known exactly. Additionally, an adjustment body for use with the method as well as a method for simple and exact adjustment of a multi-part adjustment body shall be provided by the invention.

SUMMARY

The object is solved by the independent claims.

According to the invention, a method for adjusting a measuring device is proposed. The measuring device comprises an interferometer unit with an optical axis, an optical distance measuring device having a measuring axis and a support slide arranged between the interferometer unit and the optical distance measuring device that is moveable along a slide axis. The optical distance measuring device is configured to measure or determine the position of the support slide in the direction of the slide axis. A workpiece to be measured can be arranged at the support slide. The measuring device is particularly configured for measuring radii of spherical workpieces or spherical workpiece portions. For example, the measuring device can be used for radii measurement of lenses.

In a preferred embodiment the interferometer unit is configured as Fizeau interferometer. Preferably the Fizeau interferometer has a replaceable or exchangeable Fizeau object lens. The optical distance measuring device can be formed as an interferometer measuring a displacement or a distance (Displacement Measuring Interferometer, briefly: DMI).

In the method for adjusting of a measuring device according to the invention, the measuring axis of the optical distance measuring device is first aligned parallel with the slide axis. As an option, additionally the optical axis of the interferometer unit can be aligned parallel with the slide axis.

For the further method an alignment body is used that can be arranged at the support slide prior or preferably after the alignment of the measuring axis. The adjustment body has a front side and a back side opposite to the front side. The front side is facing the interferometer unit and the back side is facing the distance measuring device. The adjustment body can be moved along the slide axis by the support slide. The adjustment body can be positioned relative to the support slide in several translational and/or rotational degrees of freedom, e.g. can be shifted in one or two directions rectangularly to the slide axis and/or inclined or tilted about one or two directions rectangular to the slide axis. For this the support slide has a holding device with respective adjustment means.

The adjustment body has at least one spherical reflection and/or a diffraction surface each having one center point respectively at the front side. Preferably at least two and particularly exactly two spherical reflection and/or a diffraction surfaces are present at the adjustment body. As an option additionally one or more planar reflection and/or diffraction surfaces can be present. Preferably the at least one planar reflection and/or diffraction surface has a larger distance in radial direction from the at least one center point or a center axis of the front side of the adjustment body compared with the at least one spherical reflection and/or diffraction surface.

A spherical reflection and/or diffraction surface means a surface that redirects the incident light. A redirection can be achieved by reflection and/or diffraction. In this context the term "spherical" refers to the effect of the achieved redirection—that corresponds to the redirection effect of a spherical reflection surface—particularly for distinguishing from a planar reflection and/or diffraction surface. If the redirection is caused by reflection, the reflection surface also has a spherical surface. For the redirection by diffraction the surface of the diffraction surface is structured, e.g. by a Computer Generated Hologram (CGH) and does not have a spherical surface, but regularly a planar surface.

The adjustment body has a retro reflector at the back side that comprises a vertex. The vertex and the at least one center point of the at least one spherical reflection and/or diffraction surface are positioned on a common center point line. The vertex can be formed, for example, by a corner point of several adjoining reflector surfaces (e.g. triple mirror reflector) or by the common center point of hemispheres of a spherical reflector. The vertex is a point of symmetry of the retro reflector relative to an incident and a reflected light ray. It is characteristic for the retro reflector that an incident light ray is reflected parallel and offset to the incident direction, wherein the distances of the two lines that extend along the incident and the reflected light rays from the vertex are equal.

The center point of each spherical reflection and/or diffraction surface of the adjustment body is positioned on the center point line. Preferably exactly one of the center points is arranged at the vertex of the retro reflector.

The distance or the distance change of the retro reflector from the optical distance measuring device can be determined by emitting a light ray, particularly a laser beam, onto the retro reflector by receiving the reflected light or laser rays and by evaluating of the time delay, phase orientation, etc. The optical distance measuring device emits the light or laser beam parallel to the measuring axis.

In order to be able to compensate temperature influences and other environmental influences on the distance measurement, the support slide can be moved in a reference point. In this reference point the distance (dead distance) between the retro reflector and the optical distance measuring device or the second interferometer is determined, in order to be able to calculate the environmental influences on the distance measurement.

For adjustment of a measuring device the tilt of the object lens, particularly the Fizeau object lens, with reference to the optical axis of the interferometer unit is eliminated. In doing so, an arbitrary test object is arranged in the Cat's Eye Position and the object lens is tilted or inclined about an x- and/or y-direction of a Cartesian coordinate system until no or only a few interference fringes are visible in the interference pattern. Subsequently, instead of the test object the adjustment body is used for the further adjustment. A spherical wavefront is emitted onto the at least one spherical reflection and/or diffraction surface by the interferometer unit, is redirected there (reflected and/or diffracted) and is received by the interferometer unit as a spherical return wavefront. In the interferometer unit an interference pattern is created based on the spherical return wavefront and a reference wavefront generated in the interferometer unit. The interference pattern can be evaluated with reference to characteristic positions of a focus of the emitted spherical wavefront in relation to the spherical reflection and/or diffraction surface. The adjustment body is shifted by means of the support slide parallel to the slide axis until the focus of the spherical wavefront and the center point of the spherical reflection and/or diffraction surface substantially coincide. Subsequently, the object lens of the interferometer unit is shifted rectangularly to the slide axis until no or only a few fringes are visible in the interference pattern. Then the position of the focus of the spherical wavefront in the plane rectangular to the slide axis coincides with the center point of the spherical reflection and/or diffraction surface. A fine adjustment along the slide axis can be omitted. A positioning in which the focus of the spherical wavefront and the center point of the spherical reflection and/or diffraction surface coincide in the plane rectangular to the slide axis and at least substantially coincide in the direction of the slide axis is sufficient. This position is called confocal position.

In this confocal position the center point line extends through the focus of the spherical wavefront. The measuring axis extends always through the vertex and preferably also through the focus of the spherical wavefront, particularly in the case where the vertex and the center point of the spherical reflection and/or diffraction surface coincide. Because the measuring axis is aligned parallel with the slide axis, a movement starting from the confocal position in a further characteristic position during the radius measurement of a workpiece by shifting the support slide can be executed without creating an Abbe-fault.

After the adjustment of the measuring device by using the adjustment body, the adjustment body can remain at the support slide and does not have to be removed for the measurement of workpieces in the measuring device. An aperture that is switchable between an open position and a closed position can be present at the support slide and can be arranged between a mount for a workpiece and the adjustment body at the side of the mount for the workpiece that faces away from the interferometer unit. In doing so, the retro reflector of the adjustment body can be used for the measurement of the distance or displacement of the support slide during measurement of workpieces.

The interference pattern can have one parabolic component and two linear components during a relative movement between the adjustment body and the interferometer unit parallel and/or rectangular to the slide axis and/or by inclining or tilting relative to the slide axis. It is advantageous, if this relative movement is executed such that the parabolic component and the linear components are minimized or completely eliminated. If the interference pattern is substantially or completely free of fringes, the position of the target focus or virtual focus of the emitted spherical wavefront in the plane rectangular to the slide axis coincides with the center point of the spherical reflection and/or diffraction surface, at which the spherical wavefront is reflected.

It is also advantageous, if the adjustment body comprises a first spherical reflection and/or diffraction surface and a second spherical reflection and/or diffraction surface with different radii at the front side. The center points of the first reflection and/or diffraction surface and the second reflection and/or diffraction surface are arranged on a common center point line. In doing so, the center point of the first spherical reflection and/or diffraction surface can be arranged behind the front side of the adjustment body and the center point of the second spherical reflection and/or diffraction surface can be arranged in front of the front side of the adjustment body.

For aligning the center point line of the adjustment body parallel to the slide axis the adjustment body can be moved in the first confocal position defined by the first spherical reflection and/or diffraction surface as well as in the second confocal position defined by the second spherical reflection and/or diffraction surface. In the first confocal position the adjustment body is shifted linearly along at least one direction rectangularly to the slide axis and in the second confocal position the adjustment body is tilted or inclined about at least one direction that is orientated rectangularly to the slide axis. The shifting and/or tilting of the adjustment body in the two confocal positions can be repeated iteratively. The shifting and/or tilting is executed until the interference pattern in the first confocal position as well as the interference pattern in the second confocal position indicate that the center point line is orientated parallel to the slide axis. This is particularly the case, if the number of fringes in the interference patterns in both confocal positions is minimum or no fringes are visible anymore.

Preferably the adjustment body is exclusively shifted relative to the slide axis in the first confocal position and is exclusively inclined or tilted relative to the slide axis in the second confocal position.

It is further advantageous, if the adjustment body is shifted along at least one direction rectangular to the slide axis after the alignment of the center point line, in order to improve the signal strength and/or signal quality of an interferometer that measures the shift (DMI). In such interferometers a light ray or laser ray is emitted onto the retro reflector and a reflected light ray extending parallel to the emitted light ray is received. For interferometric measurement a super position of the reflected light ray with a reference light ray is necessary. Therefore, the distance of the emitted light ray from the received reflected light ray is pre-defined by interferometers that measure the shifting, at which an optimum signal strength or signal quality can be obtained. After alignment of the center point line the signal strength or signal quality in the interferometer that measures the shift may be lessened and can be improved again in this way.

The alignment of the measuring axis relative to the slide axis can be executed by using of an adjustment device. In one embodiment the adjustment device comprises a redirecting unit, e.g. at least one beam splitter and/or at least one mirror as well as a detector, particularly an area detector. For example, the detector can be formed by a camera, particularly a CCD-camera.

The adjustment device is arranged at the support slide for adjustment of the measuring axis. The support slide can be moved in two slide positions that are distant from each other parallel to the slide axis. In each slide position a light beam is directed from the distance measuring device onto the redirecting unit, from which a redirected light beam is directed onto the detector. The redirected light beam impinges at an impingement location onto the detector respectively. If the impingement location does not change in the slide positions or is within a predefined tolerance, the measuring axis is sufficiently orientated parallel with the slide axis. If the impingement location changes between the two slide positions in a way that the predefined tolerance is not met, the adjustment of the distance measuring device can be corrected. Preferably the two end positions of the support slide with maximum distance are selected as slide positions, in order to achieve a high accuracy.

For determination of the impingement location, the center of gravity of the light waves that impinge onto the detector can be calculated respectively.

In one embodiment the adjustment body can comprise a planar reflection and/or diffraction surface at the front side. The reflection and/or diffraction surface extend particularly in a plane that is orientated rectangularly to the center point line. The planar reflection and/or diffraction surface can be formed as a ring plane and can be arranged coaxially about the at least one spherical reflection and/or diffraction surface.

In one preferred embodiment a rectangular orientation between the center point line and the wavefront emitted from the interferometer unit can be achieved by using the planar reflection and/or diffraction surface. For that purpose a planar wavefront is emitted by the interferometer unit through a transmission plate, that is also called "transmission flat", onto the planar reflection and/or diffraction surface is redirected back to the interferometer unit as planar return wavefront (reflected and/or diffracted), wherein the interferometer unit creates an interference pattern by use of the planar return wavefront and a reference wavefront created in the interferometer unit. The adjustment body can be tilted or inclined about at least one direction that is orientated rectangular to the slide axis, until the interference pattern indicates that the planar reflection and/or diffraction surface is orientated rectangular to the optical axis of the interferometer unit. This adjustment can be used as coarse pre-adjustment in order to simplify or accelerate a subsequent, more exact adjustment of the optical axis of the interferometer unit relative to the slide axis.

The coarse pre-adjustment can comprise preferably one or more of the following steps:

Replacing the object lens of the interferometer unit by the transmission plate and using the adjustment device to orientate an emitted laser beam or light beam that leaves the transmission plate parallel with the slide axis.

Adjusting of the transmission surface of the transmission plate at which a reference wavefront is reflected for creating the interference pattern rectangularly to the slide axis by use of a reflector means—particularly a retro reflector—that is arranged at the support slide.

Using the adjustment body on the support slide to align the center point line of the adjustment body parallel with the slide axis by inclining or tilting of the adjustment body relative to the slide axis.

Subsequently the pre-adjustment is completed. The transmission plate is removed.

Then the optical axis of the interferometer unit can be aligned parallel with the slide axis by using the adjustment device with similar method steps, as it was explained above with reference to the measuring axis of the optical distance measuring device.

An adjustment body according to the invention that can be preferably used for adjustment of the measuring device by using the method as explained above, has a front side and a back side opposite to the front side. The front side comprises a first spherical reflection and/or diffraction surface and a second spherical reflection and/or diffraction surface having different radii. As an option, the front side can comprise additionally a planar reflection and/or diffraction surface. The center points of the two spherical reflection and/or diffraction surfaces are arranged on a common center point line. Preferably a planar reflection and/or diffraction surface, that is optionally present, is orientated rectangularly to the center point line.

It is preferred that the front side of the adjustment body has exactly two or exactly three reflection and/or diffraction surfaces: the first spherical reflection and/or diffraction surface, the second spherical reflection and/or diffraction surface and optionally additionally the planar reflection and/or diffraction surface. The planar reflection and/or diffraction surface is preferably coaxially arranged to the center point line and particularly directly adjoins the second spherical reflection and/or diffraction surface radially outward with reference to the center point line.

The adjustment body has a retro reflector at the back side. The retro reflector defines a vertex. The center point line extends through the vertex and the center points of the spherical reflection and/or diffraction surfaces. Preferably the retro reflector has a vertex that coincides with the center point of the first spherical reflection and/or diffraction surface. The center point of the first spherical reflection and/or diffraction surface is at least arranged closer to the vertex as the or the other center points of additional spherical reflection and/or diffraction surfaces. Particularly, the center points of the two spherical reflection and/or diffraction surfaces have different distances from the vertex of the retro reflector.

A prismatic retro reflector and/or a spherical retro reflector can be used as retro reflector.

It is preferred that the adjustment body comprises a spherical artefact with the spherical reflection and/or diffraction surfaces and as an option with the planar reflection and/or diffraction surface. The retro reflector is movably arranged rectangularly to the center point line directly or indirectly at the spherical artefact such that an adjustment of the vertex on the center point line is possible during the adjustment and/or assembly of the adjustment body.

In a preferred embodiment the first spherical reflection and/or diffraction surface is convex with view on the front side and the second spherical reflection and/or diffraction surface is concave with view on the front side. Preferably, the first reflection and/or diffraction surface is formed by a skin surface or outer surface of a spherical cap. The spherical cap is preferably symmetrically arranged with regard to the center point line. In doing so it is advantageous if the second spherical reflection and/or diffraction surface forms a ring surface that surrounds the first spherical reflection and/or diffraction surface. Preferably the first and the second spherical reflection and/or diffraction surfaces adjoin each other directly with view radially to the center point line.

A multipart adjustment body with a spherical artefact and a retro reflector can be adjusted or assembled as follows:

For adjusting the measuring device with the interferometer unit, the optical distance measuring device and the support slide and additionally an adjustment device are used. In one embodiment the adjustment device comprises a redirecting unit, for example at least one beam splitter and/or at least one mirror as well as a detector, particularly an area detector. The detector can be formed by a camera, particularly a CCD-camera, for example. The adjustment device is arranged at the support slide.

At the support slide an already adjusted spherical retro reflector is arranged as reference. Such spherical retro reflectors are also called "Spherical-Mounted Retro Reflectors" (SMR) and have spherical cap surface as well as a retro reflector, wherein the vertex of the retro reflector coincides with the center point of the spherical cap surface. The spherical wavefront is emitted by the interferometer unit, reflected on the spherical cap surface and received as reflected spherical return wavefront in the interferometer unit for creating an interference pattern. The spherical retro reflector is moved parallel and rectangular to the slide axis in the confocal position defined by the spherical cap surface.

In this confocal position a reference measurement value characterizing the confocal position is measured by the distance measuring device and the adjustment device. For example a light beam can be directed from a distance measuring device onto the retro reflector, can be reflected there and can be redirected by the redirecting unit onto the detector. The impingement location of the light beam on the detector defines a measurement value that characterizes the position of the retro reflector radially with reference to the measuring axis or the slide axis and that can be used as reference measurement value.

Subsequently the spherical retro reflector is removed from the measuring device and replaced by the adjustment body. Then a spherical wavefront is emitted again by the interferometer unit, is reflected and thus creates an interference pattern in the interferometer unit. For creating the reflected spherical return wavefront particularly the first spherical reflection and/or diffraction surface is used, that is for example the inner reflection and/or diffraction surface. The adjustment body is moved in the confocal position, particularly the first confocal position that is defined by the used spherical reflection and/or diffraction surface.

When the confocal position of the adjustment body is reached, the position of the spherical artefact remains unchanged and the retro reflector is shifted rectangular with reference to the center point line relative to the spherical artefact. A measurement value characterizing the position of the retro reflector is determined continuously or repeatedly by the adjustment device. The shifting of the retro reflector is executed until the axially measured measurement value coincides with the reference measurement value that was determined previously. If the position of the retro reflector is reached, the retro reflector and the spherical artefact are fixed relative to each other.

BRIEF DESCRIPTION OF THE DRAWINGS

Preferred embodiments of the invention derived from the dependent claims, the description and the drawings. In the following preferred embodiments of the invention are explained in detail with reference to the drawings. The drawings show:

FIG. 1 a perspective illustration of an embodiment of a measuring device,

FIGS. 1a and 1b a support slide of the measuring device of FIG. 1 in different views, FIGS. 2 and 3 schematic block diagram like illustration of different measuring positions of a spherical workpiece respectively for measuring the radius by a measuring device according to FIG. 1, FIG. 4 a schematic block diagram like illustration of the creation of an Abbe-fault during measurement of the radius of a spherical workpiece, FIG. 5 a perspective illustration of an embodiment of a spherical artefact of an adjustment body, FIG. 6 the spherical artefact of FIG. 5 in a plain view on the front side, FIG. 7 the spherical artefact according to FIGS. 5 and 6 in a cross-section along the cutting line VII-VII in FIG. 6, FIG. 8 a schematic basic illustration of a retro reflector of an adjustment body, FIG. 9 a schematic basic illustration of an embodiment of an adjustment body comprising a spherical artefact according to FIGS. 5 and 7 and a retro reflector according to FIG. 8, FIG. 10 a schematic basic illustration of another embodiment of an adjustment body with a spherical artefact according to FIGS. 5 to 7 and a spherical retro reflector, FIGS. 11 and 12 a schematic block diagram like illustration of a method for adjusting an adjustment body having a spherical artefact and a retro reflector, FIG. 13 a schematic block diagram like illustration of a measuring device according to FIG. 1 with an adjustment body according to FIG. 9 in a first confocal position, FIG. 14 the illustration of the measuring device and the adjustment body of FIG. 13, wherein the adjustment body is located in a second confocal position, FIG. 15 a schematic block diagram like illustration of a method for aligning a measuring axis parallel with the slide axis of the measurement device of FIG. 1, FIGS. 16-19 a respective schematic block diagram-like illustration of a method for aligning an optical axis of a interferometer unit parallel with a slide axis of the measuring device of FIG. 1, FIG. 20 a schematic block-diagram-like illustration of a method step for adjusting an object lens, FIGS. 21 and 22 a respective schematic block diagram like illustration of another method step for adjusting an object lens, that may be applied alternatively, FIGS. 23 and 24 an embodiment of a spherical part of an adjustment body in different views, FIG. 24 another embodiment of a spherical artefact of an adjustment body.

DETAILED DESCRIPTION

Figure 2:
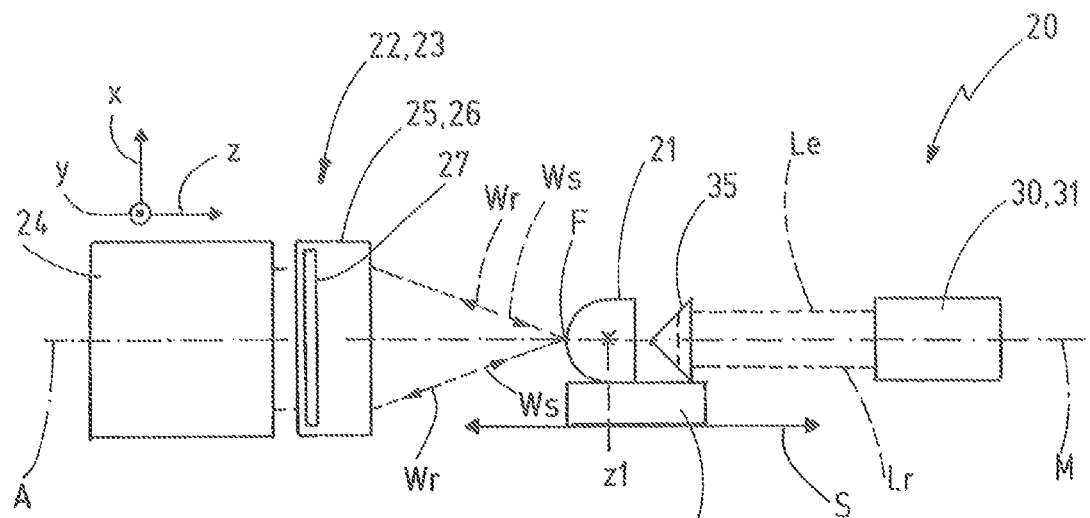
Figure 3:
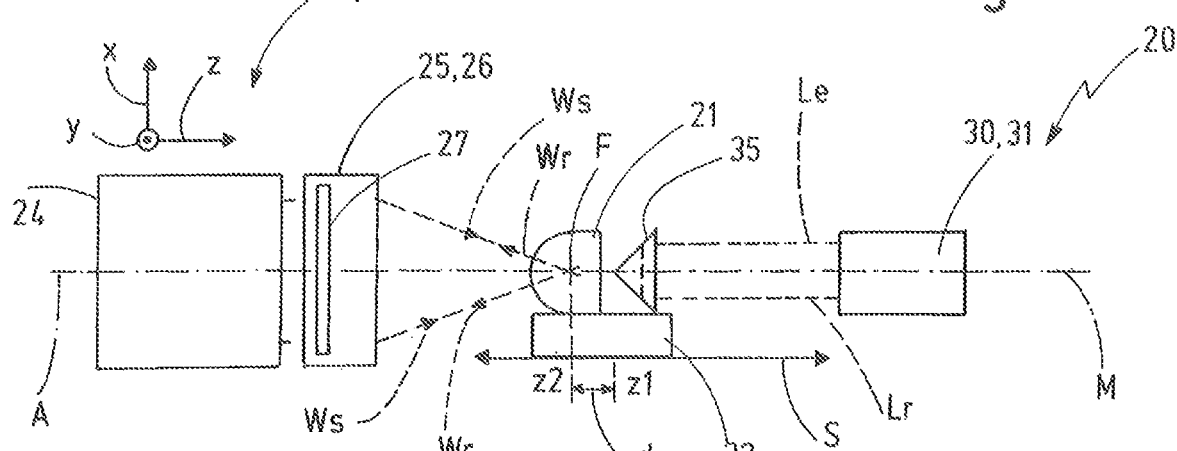
Figure 4:
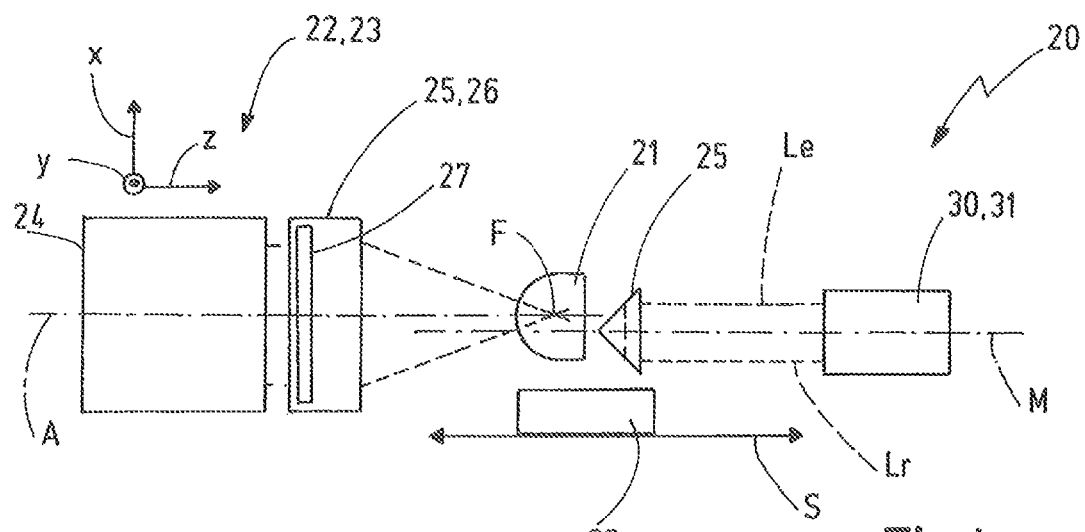

FIG. 1 shows an embodiment of a measuring device 20 for measuring a radius of a spherical surface for workpiece 21 (FIGS. 2-4). The measuring device 20 has an interferometer unit 22 that is embodied as Fizeau interferometer 23. The interferometer unit 22 comprises a first interferometer 24 and an object lens 25, for example an exchangeable Fizeau object lens 26 having a Fizeau surface 27. The interferometer unit 22 defines an optical axis A.

The measuring device 20 comprises additionally an optical distance measuring device 30 that is formed in the present embodiment by a distance measuring interferometer (DMI) that is subsequently referenced as second interferometer 31. The second interferometer 31 defines a measuring axis M. The second interferometer 31 emits a laser beam parallel to this measuring axis M that is referenced as emitted laser beam Le.

The measuring device 20 additionally comprises a support slide 32 that is arranged between the first interferometer unit 22 and the second interferometer 31 that is moveable along a slide axis S. The support slide 32 serves to hold a workpiece 21 to be measured.

As illustrated in FIG. 1, the support slide 32 is moveably supported at guiderail 33 along the slide axis S. The guide rail 33, the first interferometer unit 22 and the second interferometer 31 are mounted at machine frame 34 of the measuring device 20. The alignment of the optical axis A and the measuring axis M relative to the slide axis S are adjustable by respective adjustment devices.

The machine frame 34 with a guide rail 33 defines a Cartesian coordinate system with a space direction x, a space direction y and a space direction z. The space direction z is orientated parallel to the slide axis S. The space direction x and the space direction y are orientated rectangular to the slide axis S.

The support slide 32 is shown in FIGS. 1a and 1b. It comprises a holding device 36 for holding a body, for example a workpiece 21. The holding device 36 has adjustment means 37 in order to adjust a body arranged at a holding device 36 in its orientation and position relative to the Cartesian coordinate system X, Y, Z. The adjustment means 37 can provide several rotational and/or translational degrees of freedom.

FIGS. 2 and 3 exemplarily disclose the measuring principle for measuring a radius of spherical workpiece 21. The workpiece 21 is held at the support slide 32. The support slide 32 moves the workpiece 21 in two characteristic positions along the slide axis S that are distant from each other. The interferometer unit 22 emits the spherical wavefront Ws comprising a focus F. In one characteristic position that is also referred to as "Cat's Eye Position", the focus F is located at the surface of the workpiece 21 (FIG. 2). The spherical wavefront Ws is pointsymetrically reflected with reference to the focus F at the spherical surface of the workpiece 21 and is reflected as spherical return wavefront Wr back to the interferometer unit 22. Additionally a reference wavefront is created in the interferometer unit 22 and is interfered with the received spherical return wavefront Wr. Based on the interference pattern the characteristic positions of the workpiece 21 (FIGS. 2 and 3) can be recognized.

In the other characteristic position (FIG. 3) the center point of the spherical surface of the workpiece 21 is located in the focus F of the spherical wavefront Ws. Thus, the spherical wavefront Ws impinges at a right angle on the spherical surface of the workpiece 21 and is so to say reflected back in itself. In doing so, again a characteristic interference pattern is created in the first interferometer 24 of the first interferometer unit 22.

In one characteristic position (Cat's Eye Position) according to FIG. 2, the support slide 32 has a first axis position z1 along the slide axis S. In the confocal position according to FIG. 3 the support slide 32 has a second axis position z2 along the slide axis S. The distance d between the first axis position z1 and the second axis position z2 is determined by the optical distance measuring device 30 and according to the example by the second interferometer 31. This distance d corresponds to the radius of the spherical surface of the workpiece 21. For measuring the axis positions z1, z2 or the distance d respectively, a reflector 35 is arranged at the support slide 32 that reflects the emitted laser beam Le from the second interferometer 31 as reflected laser beam Lr back to the second interferometer 31. There, the reflected laser beam Lr is interfered, for example with a reference laser beam, and out of it the distance from the reflector 35 is determined. Based on this value, the axis positions of the distance d can be determined, by which the support slide 32 moves along the slide axis S.

If the measuring device 20 is not ideally adjusted, measuring faults can be created during the determination of the radius of the spherical workpiece 21, particularly an Abbe-fault. The Abbe-fault is created if the measuring axis M does not extend throughout the focus F of the spherical wavefront Ws (FIG. 4).

By means of an adjustment body 40 and a method possibility is provided according to the invention for adjusting the measuring device 20 and for aligning the axes A, M, S relative to each other.

Figure 5:
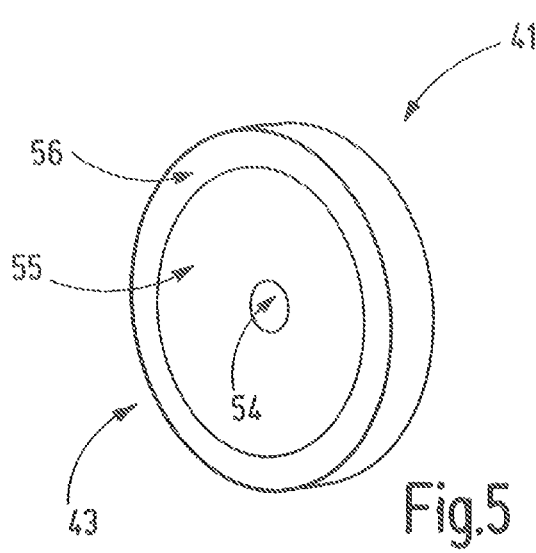
Figure 6:
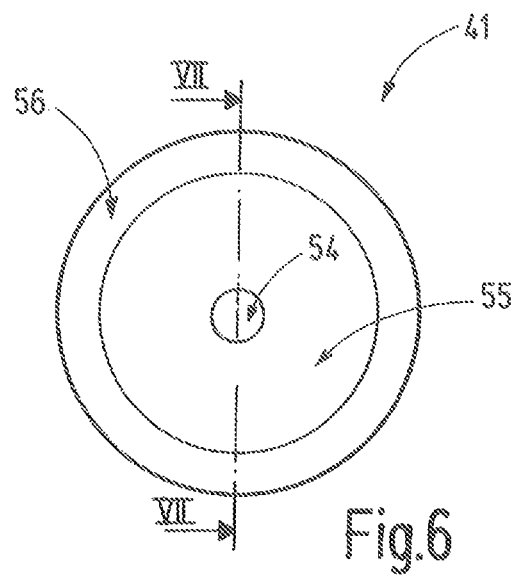
Figure 7:
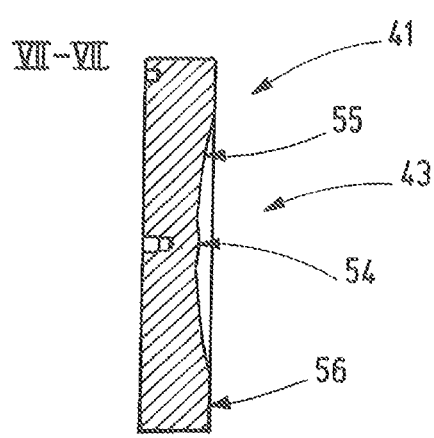
Figure 9:
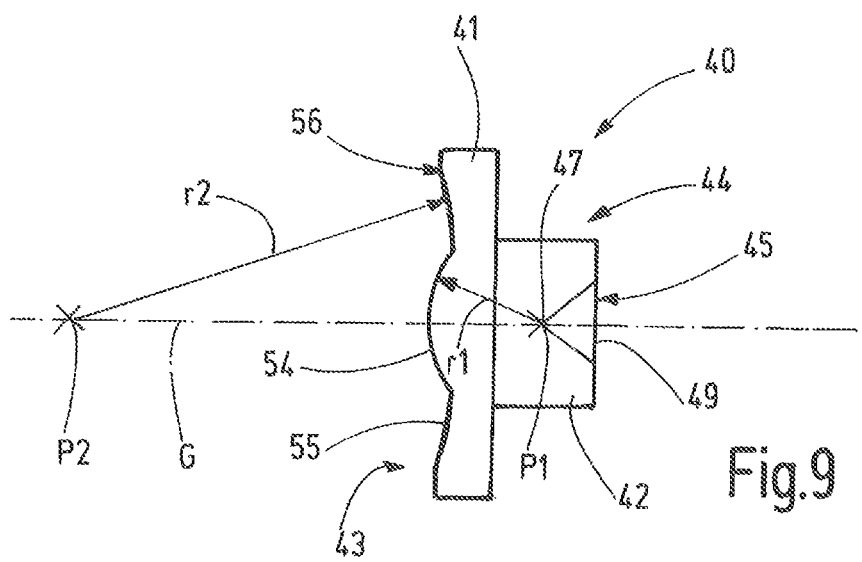
Figure 10:
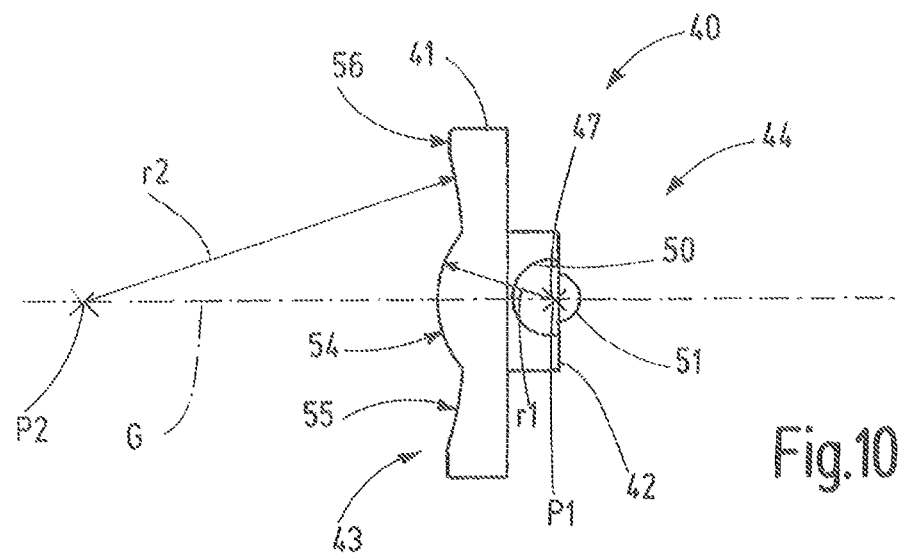

In doing so an adjustment body 40 is used that is configured in two parts in a preferred embodiment (FIGS. 9 and 10). The adjustment body according to the invention has a spherical artefact 41 and a retro reflector 42. The spherical artefact 41 and the retro reflector 42 are movable relative to each other and can be fixed relative to each other or can be fixed directly or indirectly with each other in a desired relative position. Two embodiments of an adjustment body 40 are schematically illustrated in FIGS. 9 and 10. A preferred embodiment of the spherical artefact 41 is illustrated in FIGS. 5-7.

The adjustment body 40 has a front side 43 as well as a back side 44 opposite the front side 43. The retro reflector 42 is arranged at the back side 44.

Figure 8:
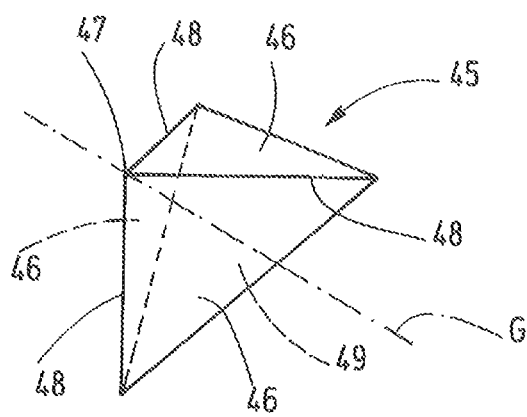

In the embodiment shown in FIG. 9 the retro reflector 42 is formed by a prismatic reflector surface arrangement 45 that is schematically illustrated in FIG. 8. The reflector surface arrangement 45 has 3 reflector surfaces 46 that adjoin each other in a corner point forming a vertex 47. Starting from the vertex 47, the reflector surface arrangement 45 has three edges 48 at which two reflector surfaces 46 adjoin respectively. The edges 48 adjoin in the vertex 47.

The two reflector surfaces 46 adjoining at a common edge 48 include a right angle. The three reflector surfaces 46 thus form a corner region of a cube. The size and the form of the reflector surfaces 46 are for example identical. The three reflector surfaces 46 are particularly formed in triangle shape. At the side opposite the vertex 47 of the reflector surface arrangement 45 an opening 49 is provided through which a light or laser beam can enter and through which a light or laser beam reflected at the reflector surfaces 46 can leave.

Such a prismatic reflector surface arrangement 45 is illustrated in FIGS. 8 and 9. FIG. 10 shows an alternative embodiment of the retro reflector 42 as spherical retro reflector or spherical mounted retro reflector. Their spherical and for example hemispherical concave reflector surface 50 is present. A hemisphere 51 having a smaller radius compared with the reflector surface 50 is arranged at the hemisphere comprising the reflector surface 50 in a way that the center points of the hemispheres coincide. The vertex 47 is formed by the center points of the hemispheres.

An incident emitted laser beam Le is reflected in parallel alignment as reflected laser beam Lr in both embodiments of the retro reflector 42. The emitted laser beam Le and the reflected laser beam Lr are diametrically arranged with reference to a line that extends through the vertex 47 in parallel to the laser beams.

The spherical artefact 41 has at least one spherical reflection and/or diffraction surface and in the preferred embodiment described here a first spherical reflection and/or diffraction surface 45 as well as a second spherical reflection and/or diffraction surface 55. Additionally, the spherical artefact 41 comprises a third planar reflection and/or diffraction surface 56. The spherical reflection and/or diffraction surfaces 54, 55, 56 form part of the front side 43 and form the front side 43 of the spherical artefact 41 in the embodiment.

As illustrated in FIGS. 7, 9, and 10, the first spherical reflection and/or diffraction surface 54 is convex shaped with view on the front side 43 and is for example formed by an outer or skin surface of a spherical cap. The first spherical reflection and/or diffraction surface 54 has a first radius r1 and a first center point P1.

In the embodiment the second spherical reflection and/or diffraction surface 54 is a concave shaped surface with view on the front side 43 that surrounds the first spherical reflection and/or diffraction surface 54 completely in a ring-shaped manner and adjoins the first spherical reflection and/or diffraction surface 54 directly according to the example. The second spherical reflection and/or diffraction surface 55 has a second radius r2 and a second center point P2.

The amount of the first radius r1 is smaller than the amount of the second radius r2 in the preferred embodiment.

The two center points P1, P2 are located on a common center point line G. The spherical artefact 41 and the retro reflector 42 are positioned in a way relative to each other such that the center point line G extends through the vertex 47.

The distance of the first center point P1 from the vertex 47 is smaller than the distance of all other center points and according to the example of the second center point P2 from the vertex 47. In the preferred embodiment the first center point P1 is identical with the vertex 47 of the retro reflector 42 or is at least arranged with smaller distance of at most 0.5 mm or at most 0.25 mm or at most 0.1 mm from the vertex 47.

In the embodiment the planar reflection and/or diffraction surface 56 adjoins the second spherical reflection and/or diffraction surface 55 directly. The planar reflection and/or diffraction surface 56 is formed as a ring surface and surrounds the spherical reflection and/or diffraction surfaces 54, 55.

Subsequently the procedure is explained for adjusting the measuring device 20 and for adjusting of an adjustment body 40 by using the measuring device 20.

Figure 15:
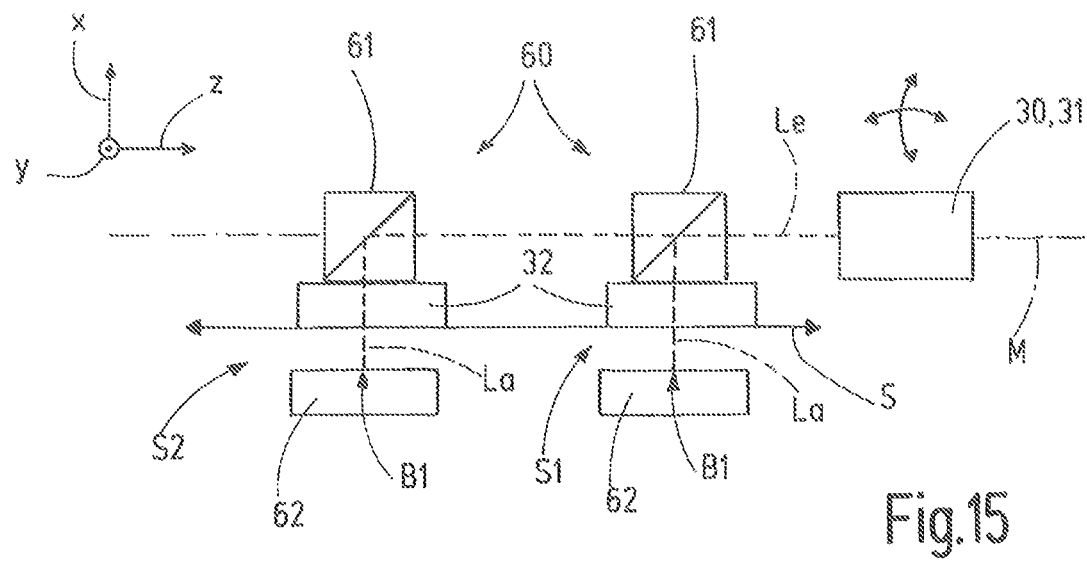

First, the measuring axis M defined by the second interferometer 31 is aligned parallel to the slide axis S. The principle is illustrated in FIG. 15. For aligning the measuring axis M an adjustment device 60 comprising a redirecting unit 61 as well as a detector 62 is used and arranged at the support slide 32. An emitted laser beam Le is emitted from the second interferometer 31 and directed onto the redirecting unit 61. From the redirecting unit 61 a redirected laser beam La is redirected to the detector 62. The redirected laser beam La impinges at an impingement location onto the detector 62. The detector 62 is preferably an area detector and can be formed by a camera, particularly a CCD-camera, for example.

The support slide 32 is moved in a first slide position S1 that is for example positioned as close as possible at the second interferometer 31 and can define an end position of the support slide 32. The redirected laser beam La impinges at a first impingement location B1 on the detector 62. Subsequently the support slide 32 together with the adjustment device 60 is moved in a second slide position S2, that is particularly located as close as possible at the interferometer unit 22 and can be an opposite end position of the support slide 32. In this second slide position S2 the redirected laser beam La impinges on second impingement location B2 on the detector 52. If the first impingement location B1 and the second impingement location B2 are identical of if both impingement locations B1, B2 are located within a tolerance range, the measuring axis M is sufficiently precisely oriented parallel to the slide axis S. If this is not the case, the positions and/or orientations of the second interferometer 31 relative to the slide axis S must be changed by respective adjustment means, for example by inclination about the space direction y and/or the space direction x.

The above explained method steps are executed repeatedly until a sufficient precise alignment of the measuring axis M parallel to the slide axis S is achieved.

A location of the center of gravity of the light that impinges on the detector surface can be determined as impingement location B1, B2.

Figure 19:
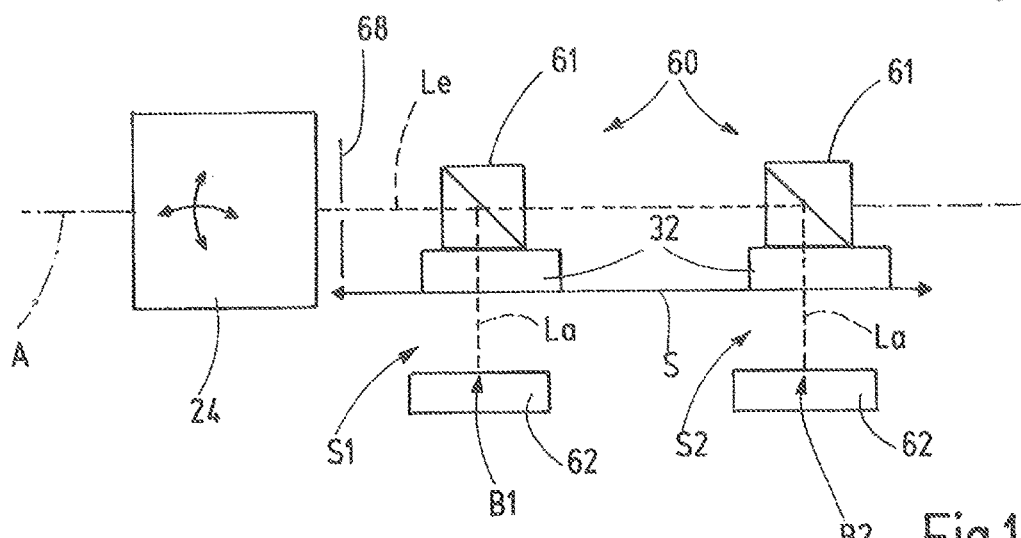

As schematically illustrated in FIG. 19 an alignment of the optical axis A relative to the slide axis S can be achieved in the same way. In doing so the emitted laser beam Le is emitted from the first interferometer 24 preferably through an aperture 68 onto the redirecting unit 61. By the aperture 68 the diameter of the emitted laser beam Le is reduced, preferably to a diameter that is approximately equal to the diameter of the emitted laser beam Le emitted from the second interferometer 31. In the two slide positions S1, S2 the respective impingement location B1 or B2 of the redirected laser beam La is determined and it is evaluated whether the two impingement locations B1, B2 are within the predefined tolerance. If this is not the case the position and/or orientation of the first interferometer 24 relative to the slide axis S is corrected, whereby shifting in the space direction x and/or the space direction y and/or inclining or tilting about the space direction x and/or the space direction y can be executed.

It should be noted that the first and second slide positions S1, S2 and the first and second impingement locations B1, B2 must not coincide during the alignment of the measuring axis M and during the alignment of the optical axis A and can be different from each other.

During the alignment of the first interferometer 24 relative to the slide axis S the object lens 25 is removed and no focused light is created.

Figure 16:
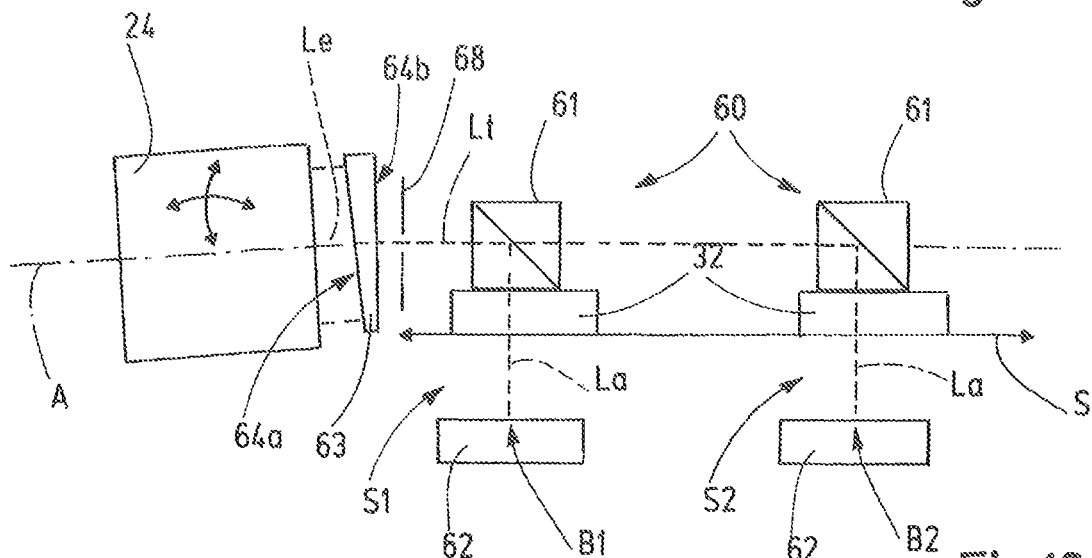
Figure 17:
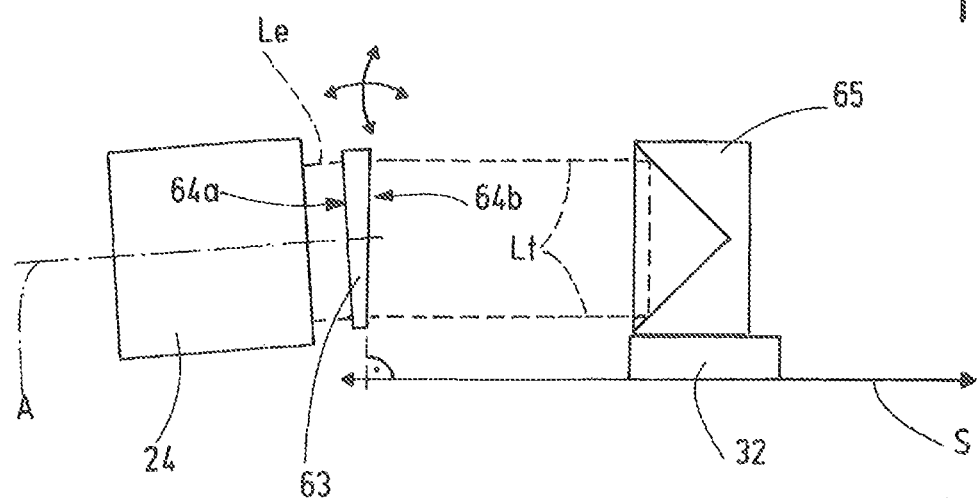
Figure 18:
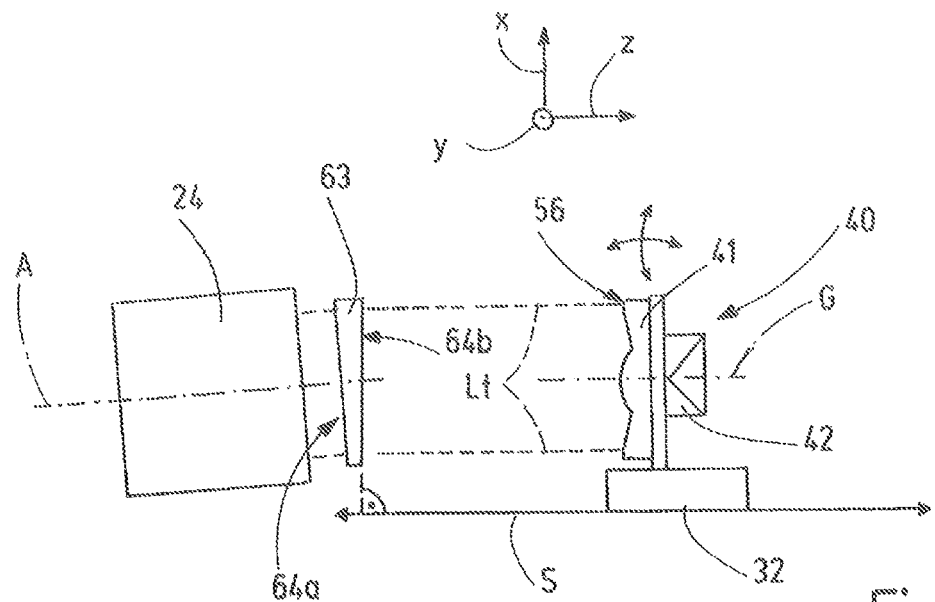

In order to simplify or accelerate the following exact adjustment of the center point line G of an adjustment body 40 arranged at the support slide 32 the method steps shown in FIGS. 16-18 can be executed first, prior to aligning the optical axis A of the first interferometer 24 parallel with the slide axis S, as it was explained above by reference to FIG. 19.

In the method step shown in FIG. 16 the adjustment device 60 is used first analog to the method procedure as it was explained with reference to FIG. 19. A transmission plate 63 is inserted in the ray path of the emitted laser beam Le emitted from the first interferometer 24. The transmission plate 63 has two transmission surfaces 64a, 64b that are orientated non-parallel to each other and the transmission plate 63 has thus a wedge-shaped form. The first transmission surface 64a faces the first interferometer 24. The opposite second transmission surface 64b faces the beam splitter 61 of the adjustment device 60. The aperture 68 is preferably arranged between the transmission plate 63 and the beam splitter 61. The emitted laser beam Le impinges on the first transmission surface 64a. Light that passes through the transmission plate 63 leaves the second transmission surface 64b as transmission light beam or transmission laser beam Lt and is limited in the diameter by the aperture 68. The transmission laser beam Lt is aligned parallel with the slide axis S by the adjustment device 60. In doing so the support slide 32 together with the beam splitter 61 and the detector 62 can be moved in different slide positions S1, S2 along the slide axis S until the impingement locations B1, B2 are at least within a predefined tolerance range. The first interferometer 24 and thus the optical axis A are inclined relative to the slide axis S by appropriate adjustment means, particularly about the x-direction and/or the y-direction, until the transmission laser beam Lt is aligned sufficiently parallel with the slide axis S.

In the method procedure shown in FIG. 6 the orientation of the transmission plate 63 is not known. One or both transmission surfaces 64a, 64b can be obliquely inclined relative to the slide axis S and can be particularly non-rectangularly orientated relative to the slide axis S. Due to the wedge angle of the transmission plate 63 the optical axis A of the first interferometer 24 is inclined relative to the slide axis S and relative to the transmission laser beam Lt.

Subsequently the aperture 68 and the adjustment device 60 are removed (FIG. 17). A reflector means 65 is arranged on the support slide 32 in an arbitrary slide position along the slide axis S, wherein the reflector means 65 can be formed by a retro reflector. The reflector means 65 is configured to reflect an impinging light wave parallel to the impingement direction. Thus an interference pattern is created in the first interferometer 24. In this arrangement, the transmission plate 63 is inclined relative to the slide axis S particularly about the x-direction and/or the y-direction until the interference pattern indicates that the second transmission surface 64b, by which a reference light wave for creating the reference pattern in the first interferometer 24 is created, is rectangularly orientated to the slide axis S. The linear components in the interference pattern are minimized until only a few or new fringes are present in the interference pattern.

Following the rectangular adjustment of the second transmission surface 64b rectangular to the slide axis F the reflector means 65 is removed from the support slide 32. The adjustment body 40 is arranged at the support slide 32 or the already arranged adjustment body 40 and in the present case the spherical artefact 41 of the adjustment body 40 is used for the further adjustment (FIG. 18). The transmission laser beam Lt (planar wavefront We) is directed onto the planar reflection and/or diffraction surface 56, is reflected there and received again in the first interferometer 24 as planar return wavefront. In the first interferometer 24 an interference pattern is created that characterizes the orientation and particularly the inclination of the center point line G relative to the slide axis S or the second transmission surface 64b respectively. The adjustment body 40 is inclined relative to the slide axis S about the x-direction and/or the y-direction until the interference pattern indicates that the planar reflection and/or diffraction surface 56 is parallel with the second transmission surface 64b and thus rectangularly orientated to the slide axis S. This also means that the center point line G extends parallel with the slide axis S. The adjustment body 40 is thus aligned on the support slide 32 relative to the slide axis S.

After the method steps according to FIGS. 16-18, the optical axis A is still inclined relative to the slide axis S. Because the wedge angle of the transmission plate 36 is known, the optical axis or the first interferometer 24 can be inclined about an angle that is obtained from the geometry of the transmission plate 63 such that the optical axis A is approximately parallel with the slide axis S. Subsequently a more accurate adjustment or fine adjustment of the optical axis A parallel with the slide axis S can be carried out, as it was already explained with reference to FIG. 15. During this adjustment the adjustment body 40 with its center point line G already aligned parallel to the slide axis S can remain at the support slide 32.

After this alignment of the measuring axis M the optical axis A and the center point line G parallel to the slide axis S an adjustment of the inventive adjustment body 40 can be performed with the measuring device 20, during which the relative position between the spherical artefact 41 and the retro reflector 42 is adjusted—if this did not happen already. The method steps that are necessary to do so are schematically illustrated in FIGS. 11 and 12.

First the adjustment device 60 is arranged on the support slide 32, wherein the redirecting unit 61 comprises a beam splitter 67 according to the example. A spherical retro reflector 69 is additionally arranged on the support slide 32 that comprises a spherical cap surface 70 and a retro reflector 71, the vertex of which is arranged in the center point of the spherical cap surface 70. Such spherical retro reflectors 69 are available on the market and are also called "Spherical-Mounted Retro Reflectors".

Figure 11:
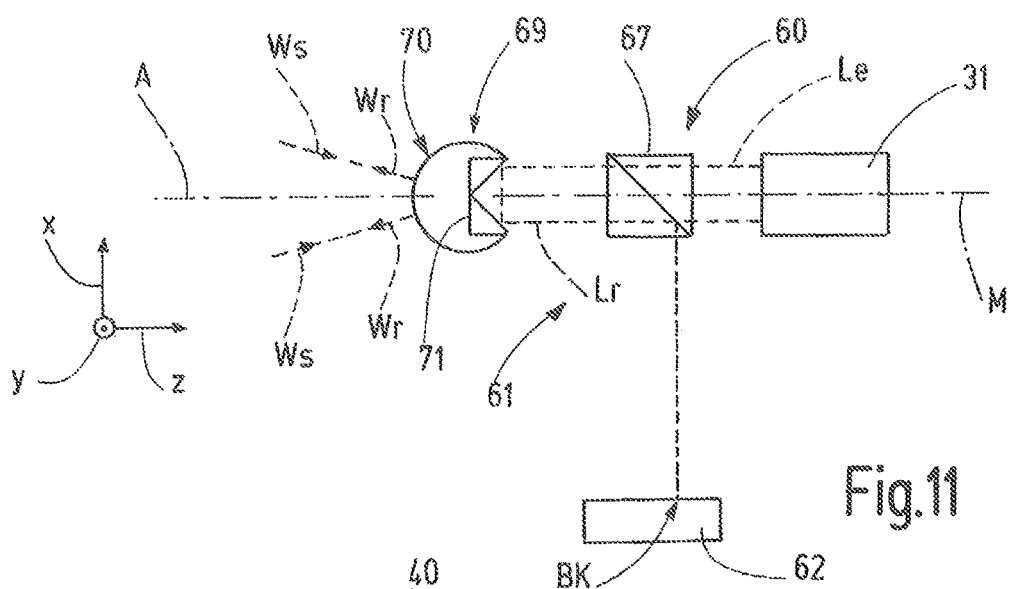
Figure 12:
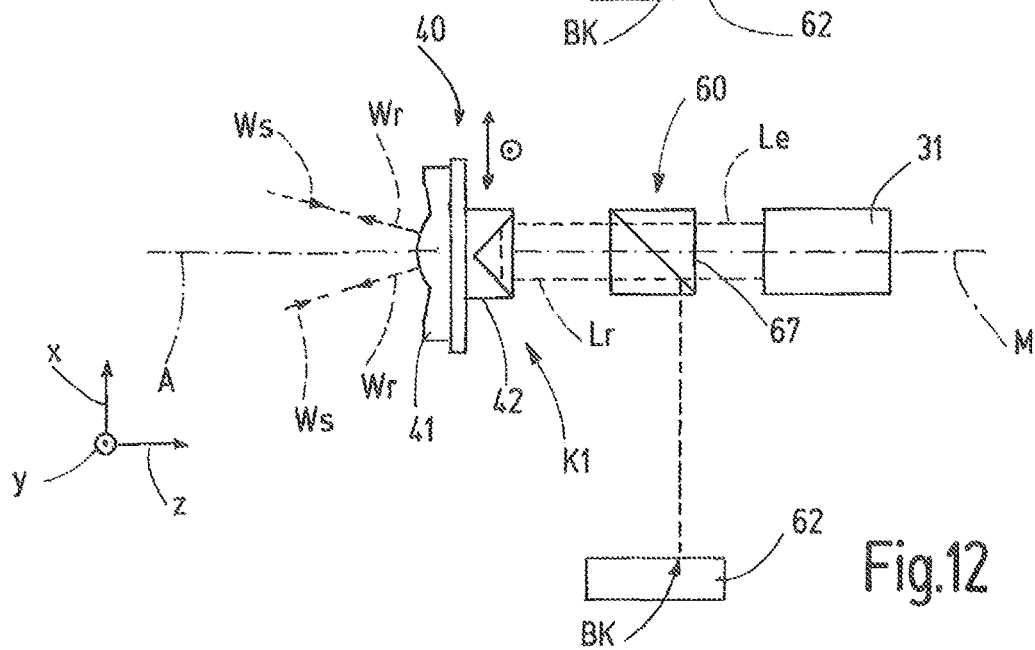

The spherical retro reflector 69 is brought in a confocal position such that the center point of the spherical cap surface 70 coincides with the focus F of a spherical wavefront Ws emitted from the interferometer unit 22, and it is illustrated in FIG. 11. A measuring value BK that characterizes the confocal position of the spherical retro reflector 69 is captured by the detector 62 of the adjustment device 60. In the embodiment this is done in that the impingement location BK in the confocal position is measured and preferably stored. For this purpose an emitted laser beam Le is directed onto the retro reflector 71 by the second interferometer 31 and is reflected there as reflected laser beam Lr back to the second interferometer 31. The beam splitter 67 is located in the light path of the reflected laser beam Lr and creates a partial beam that is directed onto the detector 62 and impinges there at the impingement location BK that characterizes the confocal position.

Subsequently the spherical retro reflector 69 is removed from the support slide 32 and is replaced by the retro reflector 42 of the adjustment body 40 that has to be adjusted. The center point line G was already aligned. The adjustment body 40 is moved parallel and rectangular to the slide axis S or to the optical axis A respectively in a first confocal position K1. In this first confocal position K1 the first center point P1 of the first spherical reflection and/or diffraction surface 54 is located in the focus F of the spherical wavefront Ws emitted from the interferometer unit 22, that is reflected back in itself as reflected wavefront Wr.

In this first confocal position K1 the retro reflector 42 is moved at a right angle to the slide axis S in x-direction and/or y-direction relative to the spherical artefact 41 until the adjustment device 60 captures a measuring value that corresponds to the measuring value that the spherical retro reflector had in its confocal position. If the retro reflector 42 has reached the corresponding position relative to the spherical artefact 41 the retro reflector 42 is directly or indirectly fixed relative to the spherical artefact 41 in this position. Subsequently the adjustment body 40 is only moved as one multipart unit and a relative movement of the retro reflector 42 relative to the spherical artefact 41 is avoided. It is important that during capture of the measuring value describing the first confocal position K1, that is the impingement location BK on the detector 62 describing the confocal position, no change of the position of the adjustment device 60 occurs compared with the position that was occupied during capturing of the measuring value of the confocal position of the spherical retro reflector.

The multipart adjustment body 40 adjusted in the way described above can in the following be used during the further adjustment of a measuring device 20 that was not already adjusted, for example in connection with its assembly or start-up. For this measuring axis M and the slide axis S are aligned parallel to each other first. Subsequently, the optical axis A is aligned parallel to the slide axis S. This can be executed by using the method steps as explained above with reference to FIGS. 15-19. Besides that the center point line G was already aligned parallel with the slide axis S.

Figure 20:
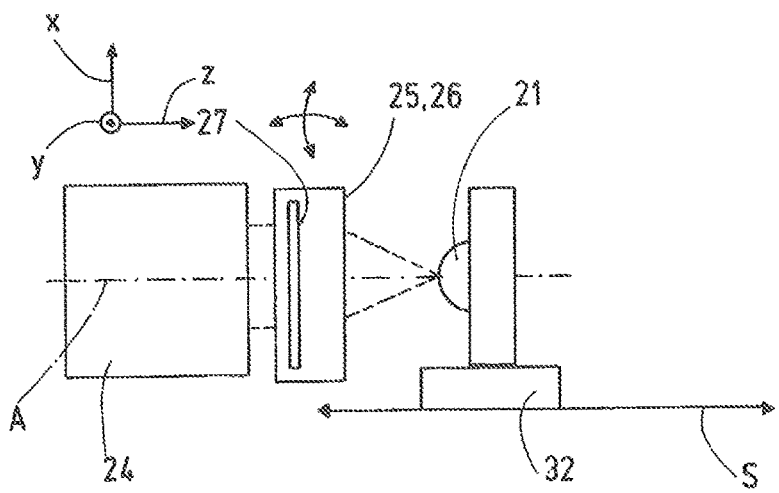

After alignment of the axes A, M, S as well as the center point line G parallel to each other the object lens 25 is arranged between the support slide 32 and the first interferometer 24. The object lens 25 must be aligned relative to the optical axis A now. In doing so, an arbitrary spherical workpiece 21 is arranged at the support slide 32 first (FIG. 20). The workpiece 21 is brought in the Cat's Eye Position in which the focus of the object lens 25 is located on the surface of the workpiece 21 which is visible based on the interference pattern in the first interferometer 24, if a spherical wavefront Ws is emitted by the interferometer unit 22. The object lens 25 is inclined or tilted about the x-direction and/or y-direction relative to the optical axis A, until the interference pattern created in the first interferometer 24 does only contain a few fringes or is free of fringes. Then, the object lens is aligned relative to the optical axis A. Particularly, the Fizeau surface 27 is orientated rectangular to the optical axis A.

Figure 21:
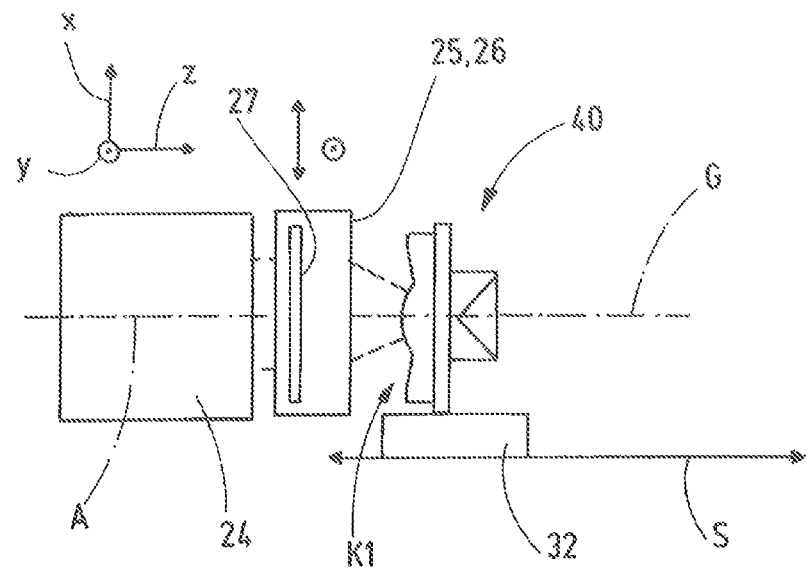
Figure 22:
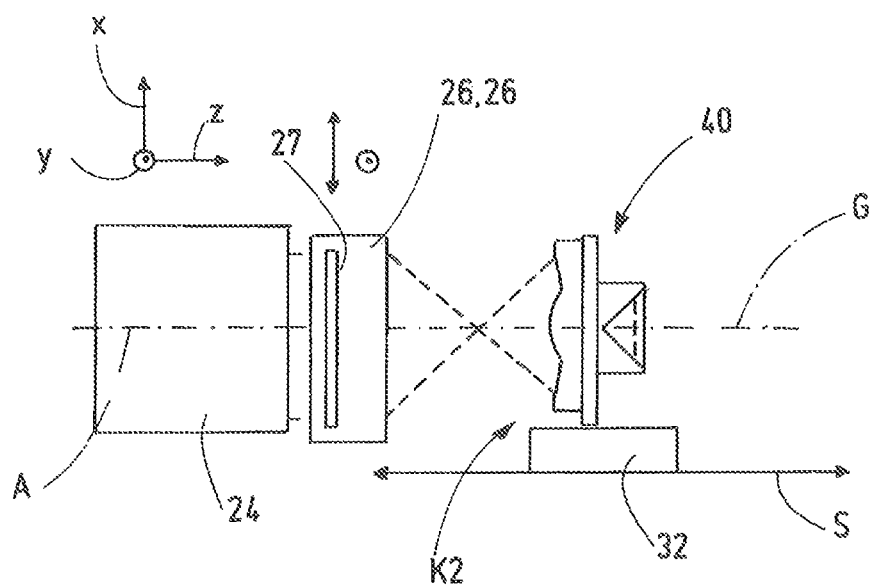

Subsequently the position of the object lens 25 is adjusted rectangular to the optical axis A. In doing so, the workpiece 21 is removed from the support slide 32 and the already adjusted adjustment body 40 is used. The adjustment body 40 can be brought in the first confocal position K1 (FIG. 21) or in the second confocal position K2 (FIG. 22) alternatively, depending on the used object lens 25. The object lens 25 is then shifted rectangularly to the optical axis A in x-direction and/or y-direction until an interference pattern created in the first interferometer 24 indicates that the confocal position have been reached. Then, the linear components in the interference pattern are minimized or eliminated.

Figure 13:
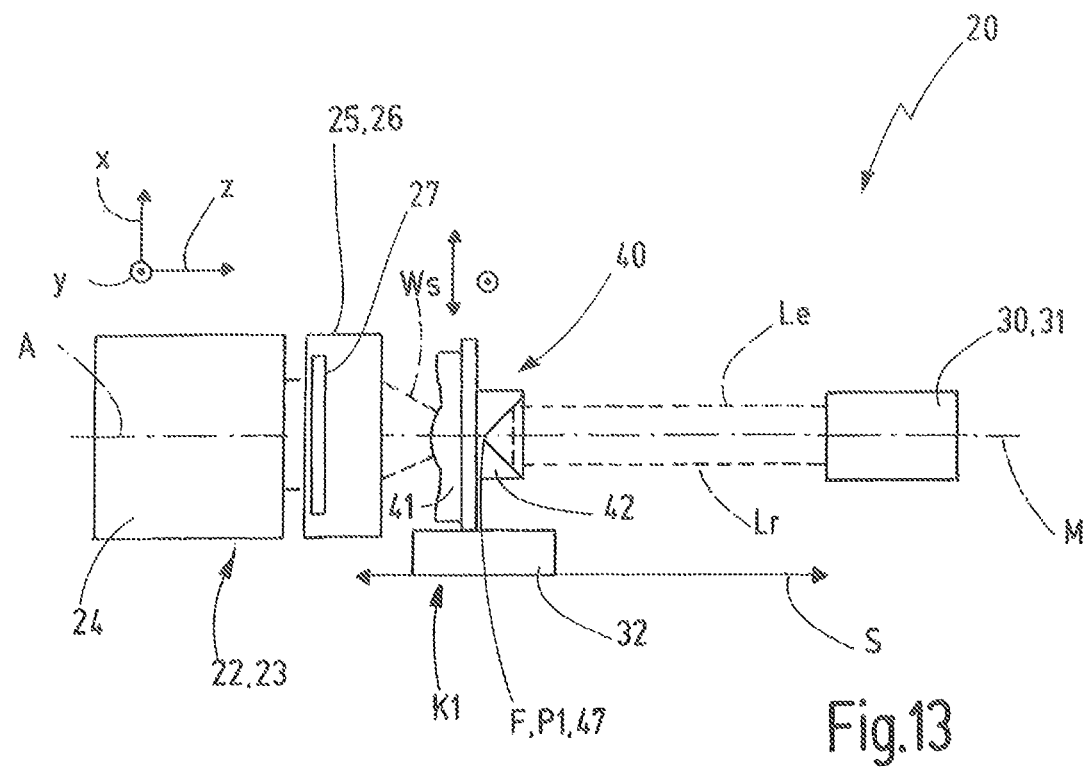
Figure 14:
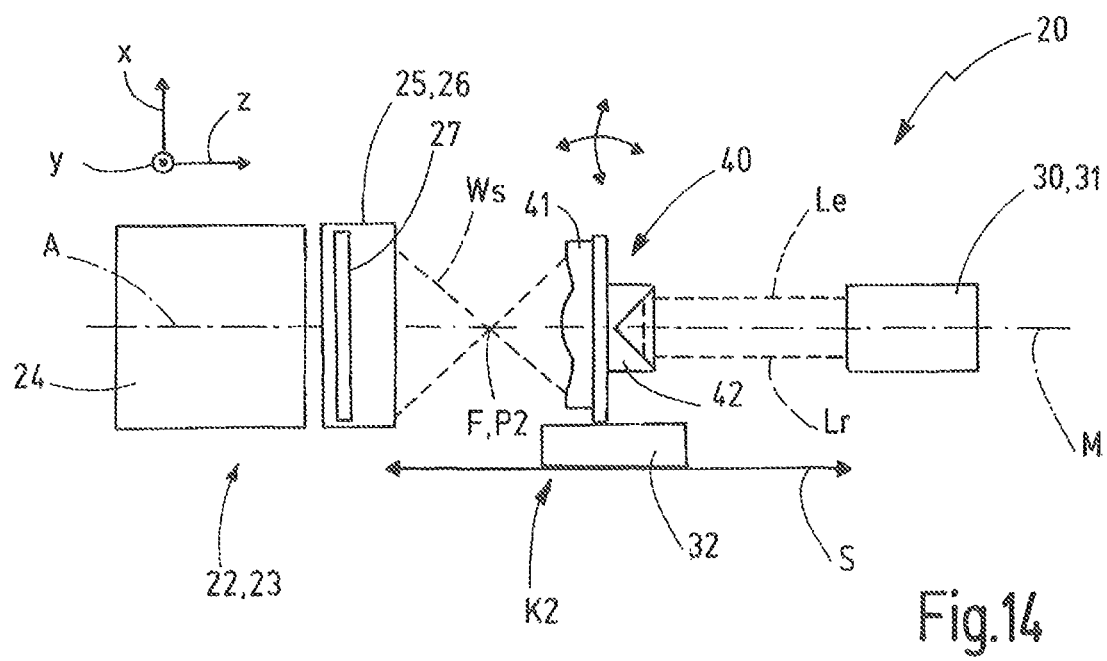

In the following an exact adjustment or fine adjustment of the center point line G parallel to the slide axis S is executed (FIGS. 13 and 14). The adjustment body 40 is moved in the first confocal position K1, in which the focus F of a spherical wave Ws emitted from the interferometer unit 22 coincides with the first center point P1 of the first spherical spherical reflection and/or diffraction surface 54. In doing so, the adjustment body 40 as a whole is shifted parallel and/or in the at least one direction x, y rectangular to the slide axis S until the interference pattern created in the first interferometer 24 indicates the first confocal position K1 (FIG. 13), particularly until the number of fringes of the interference pattern created in the first interferometer 24 is minimum. It is preferred that the adjustment body 40 is not inclined or tilted in the first confocal position K1 but is solely shifted in a plane rectangular to the slide axis S or is shifted linearly.

In this position, the measuring axis M extends through the focus F of the spherical wavefront Ws.

Subsequently, in the embodiment described herein, the support slide 32 is moved along the slide axis S until the adjustment body 40 has reached a second confocal position K2 in which the focus F of the emitted spherical wavefront Ws and the second center point P2 of the second spherical reflection and/or diffraction surface 55 coincide (FIG. 14). Preferably the adjustment body 40 is inclined in the second confocal position K2 about the space direction x and/or the space direction y that extend rectangularly to the slide axis S, until the number of fringes of the interference pattern created in the first interferometer 24 is minimum. Preferably the adjustment body 40 is not moved rectangularly to the slide axis S in the second confocal position K2.

The first confocal position K1 and the second confocal position K2 can be fringed once or multiple times and the described shifting movements and/or inclinations of the adjustment body 40 can be executed until the number of fringes of the interference pattern in the first interferometer 24 is minimum in the first confocal position K1 as well as in the second confocal position K2.

Because the adjustment body 40 according to the invention defines a center point axis G through the two center points P1, P2 an exact alignment of the measuring axis M through the focus F of the spherical wavefront Ws emitted by the interferometer unit 22 is reached in a defined measuring range at least between the first confocal position K1 and the second confocal position K2.

Independent of the radius of the spherical surface of a workpiece 21 to be measured a precise adjustment is obtained. After the adjustment of the measuring device 20 workpieces 21 with spherical surfaces having different radii can be measured without the need to adjust the measuring device 20 again. Additionally, the knowledge of the exact radii of the spherical reflection and/or diffraction surfaces 54, 55 of the adjustment body 40 are not necessary.

The adjustment body 40 remains at the support slide 32 after the completion of the adjustment and must not be disassembled for the measurement of a workpiece 21. An aperture 72 that can be switched between an open position and a closed position can be present at the support slide 32 and can be arranged between a mount 73 for the workpiece 21 and the adjustment body 40 at the side of the mount 73 for the workpiece 21 at the side facing away from the interferometer unit 22 (FIGS. 1a and 1b). The retro reflector 42 of the adjustment body 40 can be used during measurement for workpiece 21 together with the optical distance measuring device 30 configured for measuring the distance or shift of the support slide 32 along the slide axis S, for example during measurement of workpiece radii. During the measurement of the workpiece the aperture 72 is closed. If, for example after service or maintenance of the measuring device 20 or after an exchange of the object lens of the interferometer unit 22, an adjustment of the object lens 25 is again necessary, solely the aperture 72 must be opened for this purpose. For adjusting the object lens the steps are executed that were explained with reference to the FIGS. 20 and 21 or 20 and 22.

Figure 23:
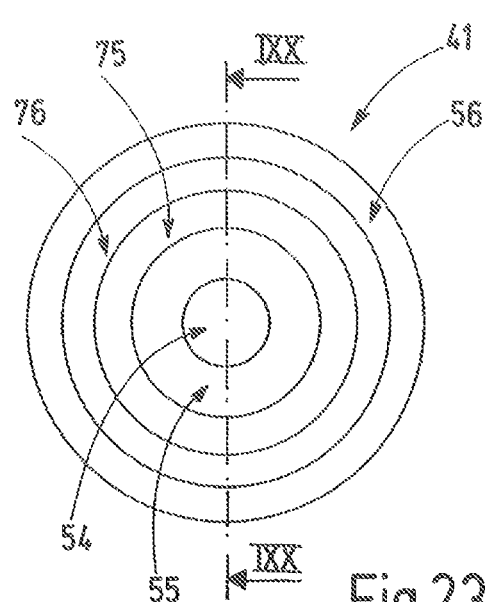
Figure 24:
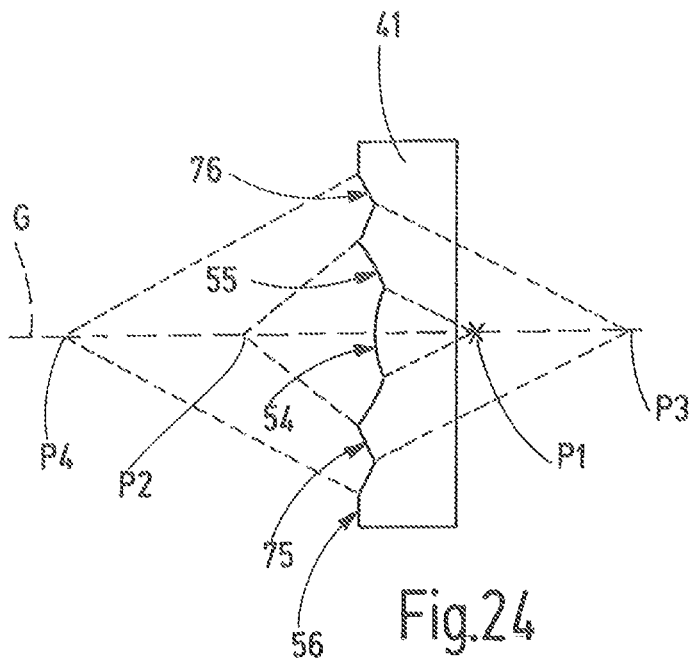
Figure 25:
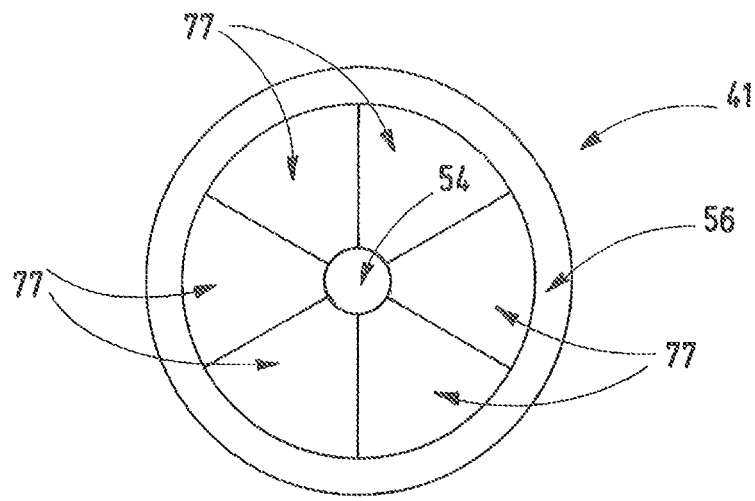

In the FIGS. 23-25 additional embodiments of spherical artefacts 41 are schematically illustrated. The spherical artefact 41 illustrated in FIGS. 23 and 24 corresponds mainly to the spherical artefact 41 according to the FIGS. 5-7, wherein instead of two spherical reflection and/or diffraction surfaces four spherical reflection and/or diffraction surfaces are present. Between the second spherical reflection and/or diffraction surface 55 and the planar reflection and/or diffraction surface 56 a third spherical reflection and/or diffraction surface 75 with a third center point P3 and a fourth spherical reflection and/or diffraction surface 76 with a fourth center point P4 are present. All of the center points P1 to P4 are located on the center point line G. The reflection and/or diffraction surfaces are alternately convex or concave with view in a radial outward direction.

In the embodiment illustrated in FIG. 25 spherical surface sectors 77 are arranged in circumferential direction side-by-side additionally to the first spherical reflection and/or diffraction surface 54 and the planar reflection and/or diffraction surface 56. In circumferential direction directly adjacent to each other arranged surface sectors 77 have different radii. Surface sectors 77 arranged diametrically opposite to each other have the same radius and the same center point.

The spherical artefacts 41 according to the FIGS. 23-25 can be used in combination with a retro reflector 42 according to FIGS. 8-10.

The invention refers to a method for adjustment of a measuring device 20, that comprises an interferometer unit 22 with an optical axis A, an optical distance measuring device 30 with a measuring axis M and a support slide 32 arranged in between, that is moveable along a slide axis S. The measuring device serves particularly for the radius measurement of spherical workpieces 21, particularly lenses. In doing so, the measuring axis M is first aligned parallel with the slide axis S and preferably the optical axis A is aligned parallel to the slide axis S. An adjustment body 40 with a first spherical reflection and/or diffraction surface 54 and a second spherical reflection and/or diffraction surface 55 and a back side retro reflector 42 is arranged at the support slide 32. It is brought into a first confocal position K1 in which a first center point P1 of the first spherical reflection and/or diffraction surface 54 coincides with the focus F of the spherical wavefront Ws emitted from the interferometer unit. The retro reflector 42 defines a vertex 47 that is located close to or on the first center point P1 such that the measuring axis M of the distance measuring device 30 extends close to or through the focus F of the emitted spherical wavefront Ws. In doing so during the subsequent measurement of spherical workpieces 21 Abbe-faults can be reduced or eliminated. The invention also refers to the adjustment body 40 as well as a method during which the retro reflector 42 is positioned relative to the center points P1, P2 of the spherical reflection and/or diffraction surfaces 54, 55.

LIST OF REFERENCE SIGNS 20 measuring device
21 workpiece
22 interferometer unit
23 Fizeau interferometer
24 first interferometer
25 object lens
26 Fizeau object lens
27 Fizeau surface
30 optical distance measuring device
31 second interferometer
32 support slide
33 guide rail
34 machine frame
35 reflector
36 holding device
37 adjustment means
40 adjustment body
41 spherical artefact
42 retro reflector
43 front side of the adjustment body
44 back side of the adjustment body
45 reflector surface arrangement
46 triangularly shaped reflector surface
47 vertex
47a vertex surface
48 edge
49 opening
50 spherical reflector surface
51 hemisphere
54 first spherical reflection and/or diffraction surface
55 second spherical reflection and/or diffraction surface
56 planar reflection and/or diffraction surface
60 adjustment device
61 redirecting unit
62 detector
63 transmission plate
64a first transmission surface
64b second transmission surface
65 reflector means
67 beam splitter
68 aperture
69 spherical retro reflector
70 spherical cap surface
71 retro reflector
72 aperture
73 mount for a workpiece
75 third spherical reflection and/or diffraction surface
76 fourth spherical reflection and/or diffraction surface
77 surface sector
A optical axis
B1 first impingement location
B2 second impingement location
BK impingement location characterizing the confocal position
d distance
F focus of the spherical wavefront
G center point line
K1 first confocal position
K2 second confocal position
La redirected laser beam
Le emitted laser beam
Lr reflected laser beam
Lt transmission laser beam
M measuring axis
P1 first center point
P2 second center point
P3 third center point
P4 fourth center point
R1 first radius
R2 second radius
S slide axis
S1 first slide position
S2 second slide position
Ws spherical wavefront
Wr return wavefront
x space direction
y space direction
z space direction
z1 first axis position
z2 second axis position

The invention claimed is:
1. A method for adjusting a measuring device (20) comprising an interferometer (22) having a first interferometer defining an optical axis (A) and having an object lens (25), a optical distance measuring device (30) having a measuring axis (M) and a support slide (32) arranged between the interferometer (22) and the optical distance measuring device (30) that is movable along a slide axis (S), the method comprising:
aligning the measuring axis (M) parallel to the slide axis (S),
positioning a workpiece (21) in a position in which the focus of the object lens (25) is located on a surface of the workpiece (21),
emitting a spherical wavefront (Ws) by the interferometer (22) on the workpiece (21),
receiving a spherical return wavefront (Wr) reflected by the workpiece (21),
creating an interference pattern by using the spherical return wavefront (Wr) in the interferometer (22),
inclining the object lens (25) relative to the optical axis (A) until the interference pattern indicates that the object lens (25) is oriented at a right angle to the optical axis (A),
removing the workpiece (21) and providing an adjustment body (40) arranged at the support slide (32) having a front side (43) and a back side (44) opposite to the front side (43), wherein the front side (43) is facing the interferometer (22) and the back side (44) is facing the optical distance measuring device (30), wherein at least one spherical reflection and/or a diffraction surface (54, 55) is present at the front side (43) and a retro reflector (42) defining a vertex (47) is present at the back side (44), wherein a center point line (G) extends through a center point (P1, P2) of the at least one spherical reflection and/or diffraction surface (54, 55) and the vertex (47),
emitting another spherical wavefront (Ws) by the interferometer (22) onto the at least one spherical reflection and/or diffraction surface (54, 55),
receiving a spherical return wavefront (Wr) reflected by the at least one spherical reflection and/or diffraction surface (54, 55),
creating an interference pattern in the interferometer (22) by using the spherical return wavefront (Wr), creating a relative movement between the adjustment body (40) and the object lens (25) of the interferometer (22) in a confocal position (K1, K2) in which the interference pattern indicates that a normal of the spherical reflection and/or diffraction surface (54, 55) and a normal of the spherical wavefront (Ws) impinging at this location are parallel, wherein the adjustment body (40) comprises a first spherical reflection and/or diffraction surface (54) and a second spherical reflection and/or diffraction surface (55) with different radii (r1, r2) at the front side, the center points (P1, P2) of which are located on the common center point line (G).

2. The method according to claim 1, further comprising creating a relative movement between the adjustment body (40) and the object lens (25) of the interferometer (22) parallel to the slide axis (S) until a parabolic component of the interference pattern is minimized.

3. The method according to claim 1, further comprising shifting the object lens (25) of the interferometer (22) at a right angle to the slide axis (S) until linear components of the interference pattern are minimized.

4. The method according to claim 1, further comprising using a distance measuring interferometer (31) as the optical distance measuring device (30).

5. The method according to claim 1, further comprising moving the adjustment body (40) in a first confocal position (K1) defined by the first spherical reflection and/or diffraction surface (54) by the support slide (32), shifting the adjustment body (40) in the first confocal position (K1) along at least one direction (x, y) orthogonal to the slide axis (S), subsequently moving the adjustment body (40) in a second confocal position (K2) defined by the second spherical reflection and/or diffraction surface, and inclining the adjustment body (40) in the second confocal position (K2) about at least one direction (x, y) orthogonal to the slide axis (S).

6. The method according to claim 5, wherein the shifting in the first confocal position (K1) and/or the inclining in the second confocal position (K2) is executed at least once or is iteratively repeated several times, until the interference patterns of the interferometer (22) in the first confocal position (K1) and the second confocal position (K2) indicate that the center point line (G) is aligned parallel to the slide axis (S).

7. The method according to claim 5, further comprising shifting the adjustment body (40) along at least one direction (x, y) orthogonal to the slide axis (S) after alignment of the center point line (G) in order to improve the signal strength and/or signal quality of a distance measuring interferometer (31) that is used as the optical distance measuring device (30).

8. The method according to claim 1, further comprising aligning, prior to or after the alignment of the measuring axis (M) parallel to the slide axis (S), the optical axis (A) of the interferometer (22) parallel to the slide axis (S).

9. The method according to claim 1, further comprising aligning with an adjustment device (60) the measuring axis (M) and/or the optical axis (A) of the interferometer (22) parallel to the slide axis (S), wherein the adjustment device (60) is arranged at the support slide (32), wherein the adjustment device (60) comprises a redirecting unit (61) and a detector (62).

10. The method according to claim 9, further comprising emitting a light beam (Le) onto the redirecting unit (61) from the interferometer (22) parallel to the optical axis (A) or from the optical distance measuring device (30) parallel to the measuring direction (M), and redirecting a redirected light beam (La) from the redirecting unit (61) onto the detector (62), moving the support slide (31) into at least two slide positions (S1, S2) with a distance to each other along the slide axis (S) and the interferometer (22), or aligning the optical distance measuring device (30) in a way such that an impingement location (B1, B2) at which the redirected light beam (La) impinges on the detector (62) in the respective slide position (S1, S2) only changes within a predefined tolerance.

11. The method according to claim 9, wherein the adjustment body comprises a planar reflection and/or diffraction surface (56) at the front side (43) and the method for aligning the optical axis (A) parallel to the slide axis (S) comprises additionally one or more of the following steps:

using a transmission plate (63) with a first transmission surface (64a) facing the first interferometer (24) and a second transmission surface (64b) facing the adjustment body (40), wherein the two transmission surfaces (64a, 64b) are non-parallel, emitting a light beam (Le) from the first interferometer (24) onto the first transmission surface (64a), and aligning a transmission light beam (Lt) leaving the second transmission surface (64b) parallel to the slide axis (S) by using the adjustment device (60), emitting a light beam (Le) from the first interferometer (24) onto the first transmission surface (64a) and reflecting a transmission light beam (Lt) leaving the second transmission surface (64b) back to the first interferometer (24), inclining or tilting the transmission plate (63) relative to the slide axis (S) until the interference pattern in the first interferometer (24) indicates that the second transmission surface (64b) is orientated at a right angle to the slide axis (S), emitting a planar wavefront (We) by the first interferometer (24) of the interferometer (22) onto the planar reflection and/or diffraction surface (56) of the adjustment body (40), receiving the planar return wavefront (Wr) reflected by the planar reflection and/or diffraction surface (56) and creating an interference pattern by using the planar return wavefront (Wr) in the first interferometer (24) and inclining or tilting the adjustment body (40) about at least one direction (x, y) orthogonal to the slide axis (S) until the interference pattern indicates that the planar reflection and/or diffraction surface (56) is oriented at a right angle to the slide axis (S).

12. The method according to claim 1, wherein the adjustment body (40) remains arranged at the support slide (32) after completion of the adjustment of the measuring device (20).

13. The method according to claim 12, wherein an aperture (72) that is switchable between an open position and a closed position is provided at the support slide (32) and is arranged between a mount (73) for the workpiece (21) and the adjustment body (40) at the side of the mount (73) facing away from the interferometer (22).

14. The method according to claim 1, wherein the object lens (25) is an exchangeable Fizeau object lens (26).

15. An adjustment body (40) for adjustment of a measuring device (20) comprising an interferometer (22) and an optical distance measuring device (30), the adjustment body comprising: a front side (43) and a back side (44) opposite to the front side (43), wherein the front side (43) comprises a first spherical reflection and/or diffraction surface (54) and a second spherical reflection and/or diffraction surface (55) that have different radii (r1, r2), center points (P1, P2) of which are located on a common center point line (G), wherein a retro reflector (42) is arranged at the back side (44), the retro reflector defining a vertex (47) that is located on the center point line (G).

16. The adjustment body according to claim 15, further comprising a spherical artefact (41) with the spherical reflection and/or diffraction surfaces (54, 55), relative to which the retro reflector (42) is moveably arranged at a right angle to the center point line (G).

17. The adjustment body according to claim 15, wherein the first spherical reflection and/or diffraction surface (54) is convex and the second spherical reflection and/or diffraction surface (55) is concave.

18. The adjustment body according to claim 15, wherein the first spherical reflection and/or diffraction surface (54) has shape of a spherical cap skin surface and the center point line (G) intersects the first spherical reflection and/or diffraction surface (54).

19. The adjustment body according to claim 18, wherein the second spherical reflection and/or diffraction surface (55) surrounds the first spherical reflection and/or diffraction surface (54) in a ring-shaped manner.

20. A method for adjusting the adjustment body (40) according to claim 15 by using the measuring device (20) comprising the interferometer (22) having an optical axis (A), an optical distance measuring device (30) having a measuring axis (M) and a support slide (32) arranged between the interferometer (22) and the optical distance measuring device (30) that is moveable along a slide axis (S), the method comprising:

arranging a spherical retro reflector (69) at the support slide (32), emitting a spherical wavefront (Ws) by the interferometer (22) onto a spherical cap surface (70) of the spherical retro reflector (69), receiving a spherical return wavefront (Wr) reflected by the spherical cap surface (70) and creating an interference pattern in the interferometer (22) by using the spherical return wavefront (Wr), shifting the spherical retro reflector (69) parallel and orthogonally to the slide axis (S) in a confocal position, in which the interference pattern indicates that the spherical wavefront (Ws) impinges orthogonally onto the spherical cap surface (70), measuring a measuring value that characterizes the confocal position of the spherical retro reflector (69) by the optical distance measuring device (30), replacing the spherical retro reflector (69) by the adjustment body (40), emitting another spherical wavefront (Ws) by the interferometer (22) on one of the spherical reflection and/or diffraction surfaces (54, 55), receiving a spherical return wavefront (Wr) reflected at the spherical reflection and/or diffraction surface (54, 55) and creating an interference pattern in the interferometer (22) by using the spherical return wavefront (Wr), shifting the adjustment body (40) parallel and orthogonally to the slide axis (S) in a confocal position (K1, K2), in which the interference pattern indicates that the spherical wavefront (Ws) impinges orthogonally onto the spherical reflection and/or diffraction surfaces (54, 55), and measuring of a position of the retro reflector (42) and shifting the retro reflector (42) relative to a spherical artefact (41) orthogonally to the center point line (G) until the position of the retro reflector (42) coincides with the measured measuring value that characterizes the confocal position of the spherical retro reflector (69).

* * * * *